United States Patent
Hanka et al.

(10) Patent No.: US 9,148,390 B2
(45) Date of Patent: Sep. 29, 2015

(54) SYSTEM AND METHOD FOR VIRTUAL CHASSIS SPLIT PREVENTION

(71) Applicants: Stephen C. Hanka, Lindon, UT (US); Roberto H. Jacob Da Silva, Oak Park, CA (US); Shaofu Wu, West Hills, CA (US); Amy Chung-Hua Chang, Temple City, CA (US)

(72) Inventors: Stephen C. Hanka, Lindon, UT (US); Roberto H. Jacob Da Silva, Oak Park, CA (US); Shaofu Wu, West Hills, CA (US); Amy Chung-Hua Chang, Temple City, CA (US)

(73) Assignee: Alcatel Lucent, Boulogne-Billancourt (FR)

(*) Notice: Subject to any disclaimer, the term of this patent is extended or adjusted under 35 U.S.C. 154(b) by 394 days.

(21) Appl. No.: 13/674,315

(22) Filed: Nov. 12, 2012

(65) Prior Publication Data

US 2013/0073711 A1    Mar. 21, 2013

Related U.S. Application Data

(63) Continuation-in-part of application No. 13/010,168, filed on Jan. 20, 2011, now Pat. No. 8,767,735.

(60) Provisional application No. 61/370,622, filed on Aug. 4, 2010, provisional application No. 61/658,159, filed on Jun. 11, 2012.

(51) Int. Cl.
| | |
|---|---|
| H04L 12/939 | (2013.01) |
| H04L 12/775 | (2013.01) |
| H04L 12/709 | (2013.01) |
| H04L 12/931 | (2013.01) |
| H04L 12/707 | (2013.01) |
| H04L 12/703 | (2013.01) |

(52) U.S. Cl.
CPC ............ *H04L 49/552* (2013.01); *H04L 45/245* (2013.01); *H04L 45/58* (2013.01); *H04L 49/40* (2013.01); *H04L 49/70* (2013.01); *H04L 45/22* (2013.01); *H04L 45/28* (2013.01)

(58) Field of Classification Search
CPC ..... H04L 49/70; H04L 45/586; H04L 45/583; H04L 45/58; H04L 49/357; H04L 45/245
See application file for complete search history.

(56) References Cited

U.S. PATENT DOCUMENTS

| | | | |
|---|---|---|---|
| 7,483,383 | B2 | 1/2009 | Santoso et al. |
| 7,505,403 | B2 | 3/2009 | Santoso et al. |
| 7,675,869 | B1 | 3/2010 | Anker et al. |
| 2011/0085559 | A1* | 4/2011 | Chung et al. ................. 370/401 |
| 2011/0149743 | A1* | 6/2011 | Agarwal et al. .............. 370/242 |
| 2011/0231833 | A1* | 9/2011 | Narayanan et al. ........... 717/171 |
| 2012/0039335 | A1 | 2/2012 | Subramanian et al. |

FOREIGN PATENT DOCUMENTS

| | | |
|---|---|---|
| EP | 1487180 A2 | 12/2004 |
| WO | 2009156451 A1 | 12/2009 |

OTHER PUBLICATIONS

International Searching Authority; International Search Report and Written Opinion; International Application No. PCT/US2013/068641; Mar. 7, 2014; 12 pgs.

* cited by examiner

*Primary Examiner* — Jung Park

(74) *Attorney, Agent, or Firm* — Loza & Loza, LLP

(57) ABSTRACT

A virtual chassis system includes a plurality of network nodes configured with a master virtual chassis address. The network nodes are connected by virtual fabric link (VFLs) that provide a connection for exchange of packets between the network nodes. The virtual chassis system is operable to provide warnings to help prevent a virtual chassis split event in response to an administrative action. The topology of the virtual chassis system is analyzed to determine the possible impact of one or more administrative actions. Based on this analysis, a warning is generated when an administrative action is requested that may lead directly or indirectly to a virtual chassis split.

17 Claims, 15 Drawing Sheets

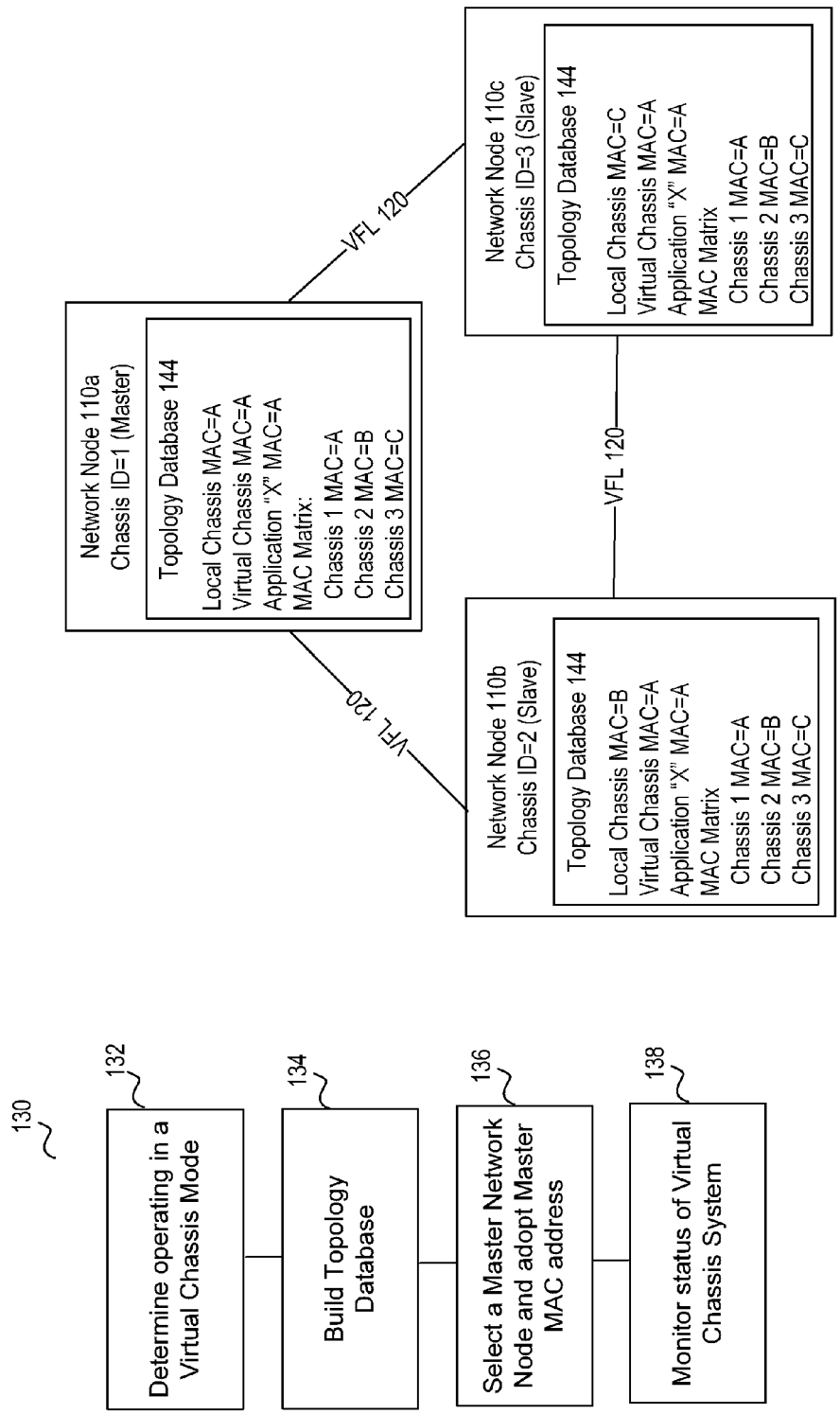

SYSTEM AND METHOD FOR VIRTUAL CHASSIS SPLIT PREVENTION

CROSS-REFERENCE TO RELATED PATENTS

The present U.S. Utility Patent Application claims priority as a continuation in part pursuant to 35 U.S.C. §120 to U.S. patent application Ser. No. 13/010,168, entitled, "SYSTEM AND METHOD FOR MULTI-CHASSIS LINK AGGREGATION," filed Jan. 20, 2011, now issued as U.S. Pat. No. 8,767,735, on Jul. 1, 2014, which is incorporated by reference herein and made part of the present U.S. Utility Patent Application for all purposes and which claims priority pursuant to 35 U.S.C. §119(e) to U.S. Provisional Application Ser. No. 61/370,622, entitled, "MULTICHASSIS VIRTUAL-FABRIC LINK AGGREGATION SYSTEM," filed Aug. 4, 2010, which is incorporated by reference herein and made part of the present U.S. Utility Patent Application for all purposes.

The present U.S. Utility Patent Application claims priority pursuant to 35 U.S.C. §119(e) to U.S. Provisional Application Ser. No. 61/658,159, entitled, "VIRTUAL CHASSIS WITH GENERIC NODE ARCHITECTURE AND TOPOLOGY," filed Jun. 11, 2012, which is incorporated by reference herein and made part of the present U.S. Utility Patent Application for all purposes.

STATEMENT REGARDING FEDERALLY SPONSORED RESEARCH OR DEVELOPMENT

Not Applicable.

INCORPORATION-BY-REFERENCE OF MATERIAL SUBMITTED ON A COMPACT DISC

Not applicable.

BACKGROUND OF THE INVENTION

1. Technical Field of the Invention

This invention relates generally to data networks and in particular to systems and methods for providing topological redundancy and resiliency between nodes of one or more data networks.

2. Description of Related Art

Data networks include various computing devices, for example, personal computers, IP telephony devices or servers that communicate with each other and/or with various other network elements or remote servers attached to the network. For example, data networks may comprise, without limitation, Metro Ethernet or Enterprise Ethernet networks that support multiple applications including, for example, voice-over-IP (VoIP), data and video applications. Such networks regularly include interconnected nodes, commonly known as switches or routers, for routing traffic through the network.

One of the key challenges faced by data networks is the need for network resiliency, i.e., the ability to maintain high availability despite eventual component failures, link failures or the like, which is critical to providing satisfactory network performance. Network resiliency may be achieved in part through topological redundancy, i.e., by providing redundant nodes (and redundant components within nodes) and multiple physical paths between nodes to prevent single points of failure, and in part through L2/L3 protocols to exploit the redundancy upon occurrences of failures to converge upon alternate paths for switching/routing traffic flows through the network. As will be appreciated, detection and convergence times must occur quickly (advantageously, in less than one second) in networks to achieve seamless transition to the alternate paths. Various types of network topologies are implemented within a network to provide redundancy between network elements, such as a ring networks, partial mesh networks, full mesh networks, hub networks, etc. Convergence times and redundancy between network elements often varies depending on the type of network typology implemented in a network.

Architectures of network elements also vary and affect network resiliency. For example, various node architectures include single switching elements, stackable switching elements, multi-slot chassis based network elements, etc. In general, depending on cost and network needs, one of these types of node architectures is selected and implemented into one of the types of network topologies. However, once implemented, it is sometimes difficult to upgrade or transition from one type of network topology to another type of network topology. It is also difficult to transition from one type of node architecture to another type of node architecture within a network topology or to incorporate various types of node architectures within one network.

Accordingly, there is a need for systems and methods for providing resiliency between nodes having one or more different types of node architectures in one or more different types of network topologies.

BRIEF DESCRIPTION OF THE SEVERAL VIEWS OF THE DRAWINGS

FIG. 2 illustrates a logical flow diagram of an embodiment of a network topology discovery process in a virtual chassis system in accordance with the present invention;

FIG. 3 illustrates a schematic block diagram of an embodiment of topology database in a network node in a virtual chassis system in accordance with the present invention;

DETAILED DESCRIPTION OF THE INVENTION

The following standards are referred to in this application and are incorporated by reference herein: 1) the Link Aggregation Control Protocol (LACP) which was formerly clause 43 of the IEEE 802.3 standard added in March 2000 by the IEEE 802.3ad task force and is currently as incorporated in IEEE 802.1AX-2008 on Nov. 3, 2008; and 2) IEEE Std. 802.1Q, Virtual Bridged Local Area Networks, 2003 edition.

Figure 1A:
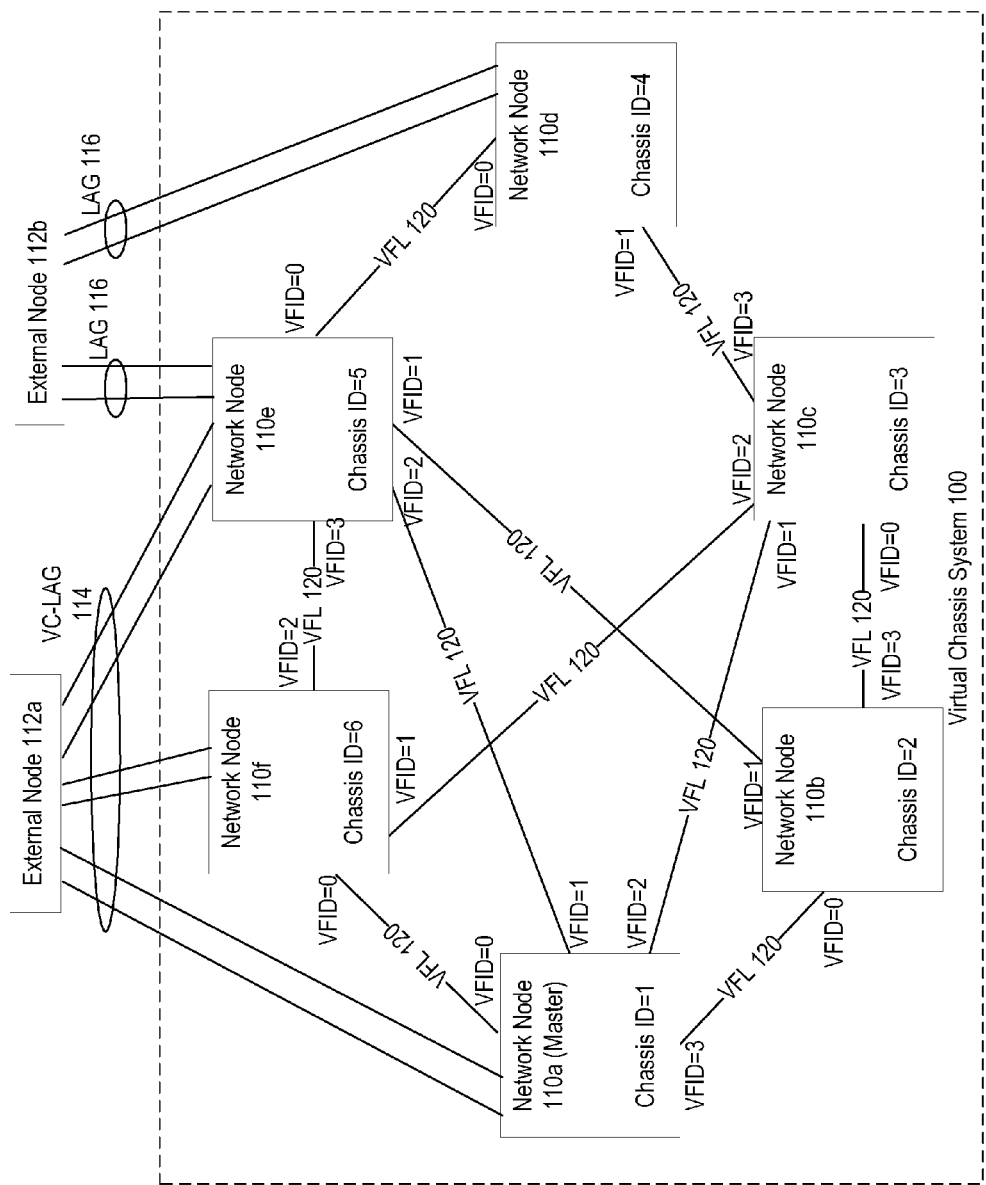
FIGS. 1*a-c* illustrate schematic block diagrams of embodiments of a virtual chassis system in accordance with the present invention.

FIG. 1a illustrates an embodiment of a virtual chassis system 100 including a plurality of network nodes 110 operably coupled by dedicated link aggregate groups for communicating control and addressing information called virtual fabric links (VFLs) 120. VFLs 120 and their operation are described in more detail in U.S. patent application Ser. No. 13/010,168, entitled, "SYSTEM AND METHOD FOR MULTI-CHASSIS LINK AGGREGATION," filed Jan. 20, 2011, pending, which is incorporated by reference herein and made part of the present U.S. Utility Patent Application for all purposes. The VFLs 120 provide connections between the network nodes 110 for exchange of information related to traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP) and the status of the network nodes and external links.

In an embodiment, the plurality of network nodes 110 operate as a single virtual network node with unified management capabilities. A master network node, e.g. network node 110a, is selected and the local MAC address of the master network node 110 is adopted as the master MAC address for the virtual chassis system 100 by the other network nodes 110. The master MAC address is utilized by external nodes 112 to address the network nodes 110 in the virtual chassis system 100. As such, the network nodes 110 operate transparently to the external nodes 112 and are treated as a single logical device by the external nodes 112.

External nodes 112 are operable to couple to one or more network nodes 110 in the virtual chassis system 100 using a single trunk or link, a link aggregate group (LAG) 116 or virtual-chassis link aggregate groups (VC-LAG) 114. To provide increased resiliency and remove a single point or even two points of failure, VC-LAG 114 is operable to couple an external node to two or more network nodes 110 in the virtual chassis system 100. The external node can use load balancing techniques to distribute traffic across the available links of VC-LAG 114. For example, one of the physical links of the VC-LAG 114 is selected by the external node to transmit a packet based on a load-balancing algorithm (usually involving a hash function operating on the source and destination Internet Protocol (IP) or Media Access Control (MAC) address information) for a more effective use of bandwidth.

During normal operation, the network nodes 110 within the virtual-chassis system share the master MAC address for system identification by a wide variety of layer 2 and layer 3 protocols. For example, the spanning tree protocol and LACP protocols use the master MAC address as the identifier for the virtual chassis system 110. Internet Protocol (IP) routing also utilizes the master MAC address to identify the virtual chassis system 100 to external network elements in the network, e.g. peers use the master MAC address as the Ethernet destination address for packets destined to the virtual chassis system 100. As such, the network nodes 110 within the virtual chassis system 100 are viewed as a single logical node by external network nodes 112. In addition, the network nodes 110 within a virtual chassis system 100 are managed as a single node with a unified administration, operations and maintenance management system.

Since the network nodes 110 within a virtual chassis system 100 are treated as a single logical device by external nodes 112, the external nodes 112 are operable to actively forward traffic on all the links of the VC-LAG 114. This feature enables multiple homing of the external nodes 112 to the network nodes 110 without requiring spanning tree protocols between the external nodes and network nodes while still facilitating a carrier-grade detection and convergence time to edge uplink failures as well as network node 110 failures. Another advantage of the active forwarding mode of all the VC-LAG 114 uplinks to the virtual chassis system 100 is increased efficiency of the use of bandwidth of the VC-LAG 114 links.

Within the virtual chassis system 100, a network node 110 is assigned a globally unique identifier called a chassis identifier or chassis ID. The network node 110 assigns an internal VFL identifier (VFID) to each of its configured VFLs 120 within the virtual chassis system 100. Since the VFID for a VFL is utilized for internal identification and configuration of VFLs 120, a network node 110 may assign the same or a different VFID to a VFL 120 as assigned by another network node 110. The VFLs 120 provide a connection for exchange of information between the network nodes 110 regarding traffic forwarding, MAC addressing, multicast flows, address resolution protocol (ARP) tables, Layer 2 control protocols (e.g. spanning tree, Ethernet ring protection, logical link detection protocol), routing protocols (e.g. RIP, OSPF, BGP), as described in more detail in U.S. patent application Ser. No. 13/010,168, entitled, "SYSTEM AND METHOD FOR MULTI-CHASSIS LINK AGGREGATION," filed Jan. 20, 2011. In an embodiment, synchronization of layer 2 address tables, such as medium access control (MAC) address tables, between the network nodes 110 is driven by layer 2 packet flows over the VFLs 120 as well as by a periodic keep-alive mechanism whereby the network node 110 that owns a given MAC address floods specific packets bearing such MAC address as the source address. The synchronization mechanism also needs to implement the standard MAC flushing mechanism to handle cases where a network node 110 or some of its components go down. MAC address source learning is enabled over the VFLs 120 through flooding of unknown destination MAC addresses. During source learning, the network nodes 110 exchange packets with prepended headers over the VFLs 120 that include source MAC addresses and associated hardware device information, such as source chassis ID, source network interface identifier and source port identifier information. The network nodes 110 use this information to maintain synchronized MAC address tables with minimum messaging based MAC table synchronization. Utilizing the synchronized MAC address table, the network nodes 110 are operable to process and forward packets between the network nodes 110 in the virtual chassis system 100.

Figure 1B:
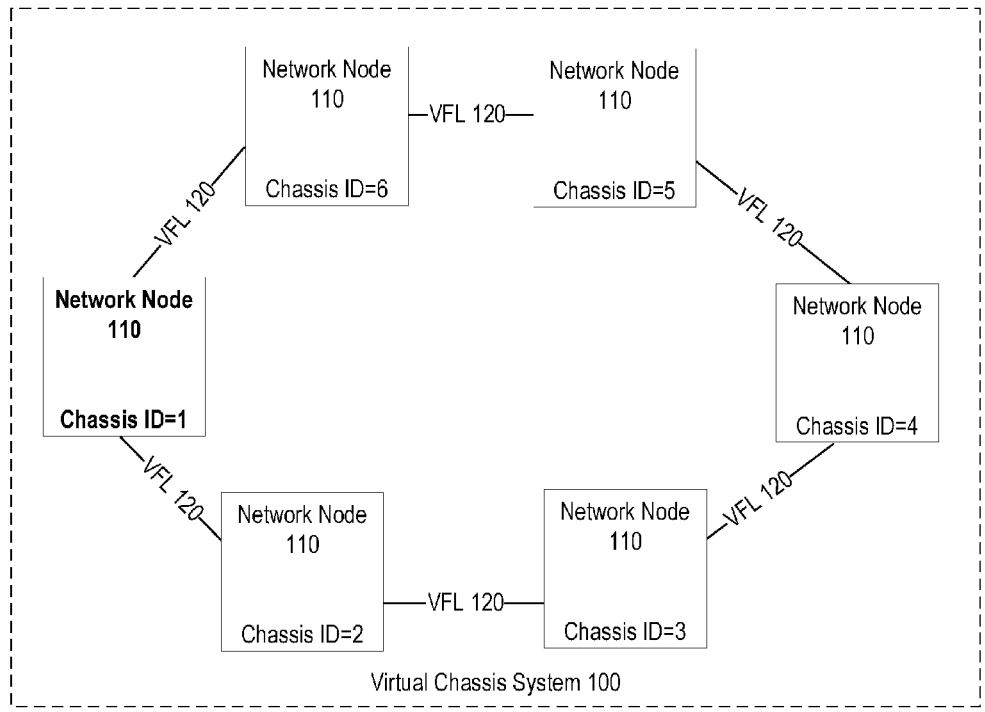
Figure 1C:
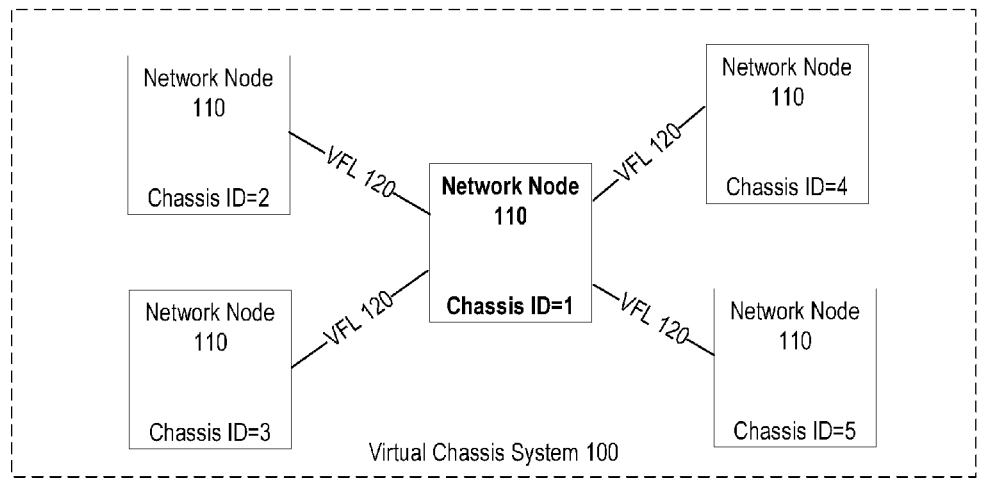

FIG. 1a illustrates that the network nodes 110 are coupled in a partial mesh network topology. However, the network nodes 110 in a virtual chassis system 100 may be coupled in any of a plurality of types of network topologies without affecting operation of the virtual chassis system 100. FIG. 1b illustrates a virtual chassis system 100 with a plurality of network nodes 110 configured in a ring network topology coupled by VFLs 120. FIG. 1c illustrates a virtual chassis system 100 with a plurality of network nodes 110 configured in a hub and spoke or star type network topology. Other network topologies not depicted, such as linear, tree, full mesh, hybrid, etc., are also be supported by the virtual chassis system 100. To support the plurality of different types of network topologies, the network nodes 110 in a virtual chassis system 100 are operable to perform a network topology discovery process.

FIG. 2 illustrates a logical flow diagram of an embodiment of a network topology discovery process 130 in a virtual chassis system 100. The process is performed by the active network nodes 110 in the virtual chassis system 100 at startup, reboot, on indication of a status change in the network or at predetermined time periods. In step 132, a network node 110 detects that it is operating in a virtual chassis mode. For example, one or more parameters of the network node 110 are configured to indicate a virtual chassis mode of operation. The network node 110 detects that the parameters indicate virtual chassis mode operation (e.g., rather than stand-alone mode or multi-chassis mode). The network node 110 then performs in step 134 one or more control protocols to discover other network nodes 110 in the virtual chassis system 100 and to exchange topology and configuration information. The network node 110 uses the information to build a topology database of the virtual chassis system 100. The topology database includes: identification information for the other network nodes 110 (e.g., local MAC address, chassis identifier), identification information for network interfaces that host active VFLs 120 (or other active inter-switch links), identification information for the VFLs 120 and their associated member ports on the network nodes 110. The network node 110 thus learns the active connections between the network nodes 110 and configuration information of the other network nodes 110 in the virtual chassis system 100. The following Table 1 is an example of a topology database for a network node 110a, in this example with e.g. chassis ID=1, following the discovery phase. Table 1 includes exemplary information stored in the topology database but other information and data not illustrated may also be included in the topology database. In addition, the topology database may be stored in separate databases or tables or combined with other tables or databases in the network node 110.

TABLE 1

Topology Database - Chassis 1

| Local Chassis Data | Neighbor [1] | Neighbor [2] | Neighbor [3] |
|---|---|---|---|
| Chassis ID = 1 | Chassis ID = 2 | Chassis ID = 4 | Chassis ID = 3 |
| Uptime = 4 min 50 sec | Uptime = 5 min 10 sec | Uptime = 5 min 5 sec | Uptime = 5 min 1 sec |
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |
| Role = unassigned | Role = unassigned | Role = unassigned | Role = unassigned |
| State = unassigned | State = unassigned | State = unassigned | State = unassigned |

In step 136 of FIG. 2, a master network node is selected to perform management and other tasks for the virtual chassis system 100. The local MAC address of the master network node is then adopted by the other network nodes 110. The following Table 2 is an example of a topology database for the elected master network node 110 with chassis ID=1. As seen in Table 2, network node with chassis ID=1 is indicated as having the master role and the other nodes are indicated as having a slave role in the topology database.

TABLE 2

Topology Database - Chassis 1

| Local Chassis Data | Neighbor [1] | Neighbor [2] | Neighbor [3] |
|---|---|---|---|
| Chassis ID = 1 | Chassis ID = 2 | Chassis ID = 4 | Chassis ID = 3 |
| Uptime = 5 min 50 sec | Uptime = 6 min 10 sec | Uptime = 6 min 5 sec | Uptime = 6 min 1 sec |
| Priority = 100 | Priority = 100 | Priority = 100 | Priority = 100 |
| Chassis MAC = A | Chassis MAC = B | Chassis MAC = D | Chassis MAC = C |
| Chassis Group = 0 | Chassis Group = 0 | Chassis Group = 0 | Chassis Group = 0 |
| Primary CMM = CMM-A | Primary CMM = CMM-A | Primary CMM = CMM-B | Primary CMM = CMM-A |
| Chassis type = OS10K | Chassis type = OS10K | Chassis type = OS10K | Chassis type = OS10K |
| Role = master | Role = slave | Role = slave | Role = slave |
| State = running | State = running | State = running | State = running |

The selection of a master network node 110 is based on a prioritized list of parameters including chassis priority, up time, chassis ID and chassis MAC address. The parameter of up time gives priority to network nodes 110 in operation for longer periods of time. The parameter of chassis priority is a user configured priority that defines the user preference of a master network node 110 regardless of chassis ID or up time. The use of various parameters adds flexibility to the selection of a master network node 110. The chassis group parameter shown in the topology database identifies the virtual chassis system 100. One or more additional virtual chassis systems 100 with different chassis group identifications may also be operable in a network. The topology database also identifies the active or primary control manager modules (CMM) in a network node 110 and the chassis type of the network node 110.

In step 138 of the network topology discovery process 130, the network node 110 performs one or more protocols to monitor the state or status of the connections and the network nodes 110 in the virtual chassis system 100. The current state of the network nodes 110 is maintained in the topology database. A detected status change in a network node 110 in the virtual chassis system 100 may initiate a change in routing, a change in the master node, etc. Through topology self-discovery and monitoring of the network nodes 110, the virtual chassis system 100 is operable to support a plurality of different types of network topologies with minimum pre-configuration and intervention.

FIG. 3 illustrates an example of topology databases 144 in network nodes 110 in a virtual chassis system 100 after selection of a master network node 110. In this example, network node 110a is adopted as the master network node and network nodes 110b and 110c are slave nodes. The local MAC address of network node 110a (e.g., master MAC address=A) is adopted by the network nodes 110a-c as the virtual chassis MAC address. In addition, the master MAC address (MAC=A) is adopted as the application MAC address for management applications.

Figure 4:
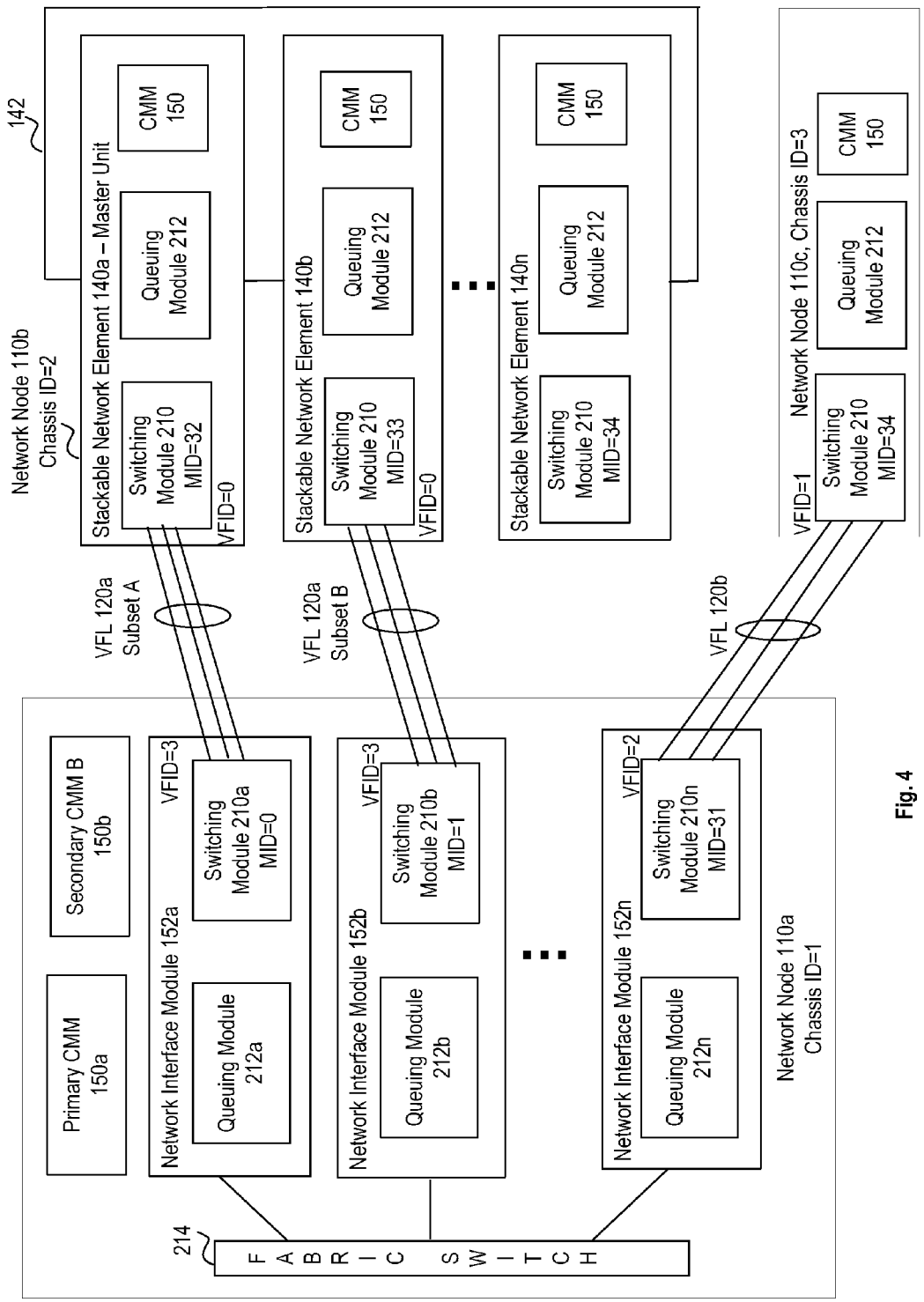
FIG. 4 illustrates a schematic block diagram of an embodiment of network nodes in a virtual chassis system in accordance with the present invention.

The virtual chassis system 100 is also operable to include network nodes 110 with one or more different types of node architectures, such as single module, stackable, or multi-slot chassis-based architectures. FIG. 4 illustrates a schematic block diagram of an embodiment of network nodes 110 in a virtual chassis system 100 with different types of node architectures. In this example, network node 110a has a multi-slot chassis-based architecture with a plurality of network interface modules 152a-n. In general, multi-slot chassis-based architectures share one enclosure, control manager modules (CMMs) 150a-b and a common power supply with one or more network interface modules (NIMs) 152a-n, such as line cards or port modules. The network interface modules 152n include a queuing module 212 and switching module 210 and are connected by a fabric switch 214 integrated into the backplane of the chassis.

Network node 110b in this example has a stackable node architecture and includes a plurality of network elements 140a-n coupled by backplane connections 142. Each network element 140a-n is operable as a stand-alone node and includes its own enclosure, control manager module (CMM) 150, switching module 210, queuing module 212 and power supply. In some stack architectures, one network element (Network Element 140a in this example) is designated as the main or master unit of the stack for management purposes.

Network node 110c has a single module node architecture, such as a single stackable element 140 or alternatively, a multi-slot chassis-based architecture with a single network interface module 152.

Network nodes 110a-c correspond to one or more of the network elements 110 in virtual chassis system 100 in FIGS. 1a-c. For example, virtual chassis system 100 is operable to include network nodes 110 with only multi-slot chassis-based node architectures or include network nodes 110 with only stackable node architectures or include a combination of network nodes 110 with two or more types of node architectures, such as multi-slot chassis-based architectures, stackable node architectures and single module node architectures. Though not shown, the virtual chassis system 100 may also include network nodes 110 comprised of other types of node architectures and configurations.

Network node 110a and network node 110b are operably coupled by VFL 120a. The network nodes 110a and 110b designate VFL 120a with an internal VFL identifier (VFID), such as VFID=3 for network node 110a and VFID=0 by network node 110b as shown in FIG. 3. Network node 110a and network node 110c are operably coupled by VFL 120b. The network nodes 110a and 110c designate VFL 120b with an internal VFL identifier (VFID), such as VFID=2 for network node 110a and VFID=1 by network node 110c as shown in FIG. 3. In addition, the network nodes 110a-c are also operable to be coupled by additional VFL 120s to one or more other network nodes 110 as shown in FIGS. 1a-c. The VFL 120a between network nodes 110a and 110b is described below as a generalization of the operation and configuration of the VFLs 120 between the various network nodes 110 in a virtual chassis system 100.

VFL 120*a* between network node 110*a* and network node 110*b* is operably coupled to one or more VFL member ports in one or more switching modules 210. For redundancy in case of failure of one or more ports, links or modules, VFL 120*a* is operable to include a plurality of aggregate links generated using the LACP or similar aggregate protocol between different switching modules 210 of the network nodes 110*a* and 110*b*. For example, in FIG. 4, VFL 120*a* includes a first subset A of physical links between NIM 152*a* of network node 110*a* and stackable network element 140*a* of network node 110*b* and a second subset B of physical links between NIM 152*b* of network node 110*a* and stackable network element 140*b* of network node 110*b*.

The network nodes 110 are assigned a unique chassis identifier in the virtual chassis system 100. The chassis ID for each network node 110 is unique and global and through the topology discovery, the network nodes 110 are aware of the chassis ID of its peer network nodes 110 in the virtual chassis system 100. In addition, unique hardware device identifiers or module identifiers (MIDs) for various components, such as the switching modules 210 and port interfaces in the network nodes 110, are generated allowing for management of local and remote objects. In an embodiment, the hardware device identifiers MIDs for the switching modules 210 have global significance within the virtual chassis system while MIDs for other components, such as queuing modules 212, may have only local significance. For example, the hardware device identifiers' assigned to the switching modules 210 are known by other network nodes 110 while hardware device identifiers for other devices are restricted to a local network node 110 and have no significance to other network nodes 110. For example, the port interfaces of a switching module 210 are assigned a global unique hardware device identifier that includes the chassis ID, switching module ID and port interface ID. In an embodiment, the network nodes 110 in the virtual chassis system operate in a pre-pended header mode to exchange data and control packets over the VFLs 120.

Figures 5, 6:
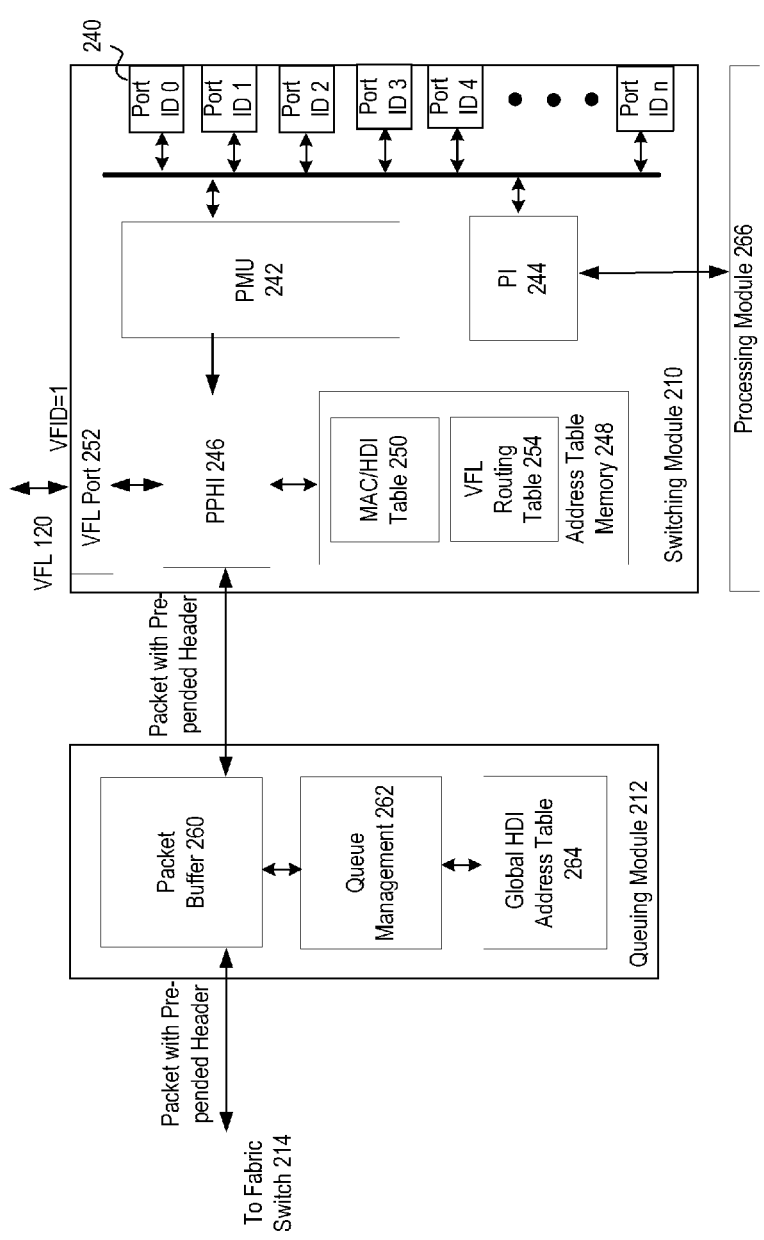
FIG. 5 illustrates a schematic block diagram of an embodiments of a network interface module of a network node in a virtual chassis system in accordance with the present invention.
FIG. 6 illustrates a schematic block diagram of an embodiment of a pre-pended header of a packet in the virtual chassis system in accordance with the present invention.

FIG. 5 illustrates a schematic block diagram of an embodiment of a network interface module (NIM) 152 operating in a prepended header mode in more detail. Though a network interface module 152 is illustrated, a stackable network element 140 or single module network element is operable to perform similar functions for operating in a prepended header mode. Switching module 210 includes a plurality of external ports 240 that are connected to external nodes 112 from the virtual chassis system 100. One or more of the external ports 240 may include member ports for a VC-LAG 114, LAG 116, single trunk or other trunk group, fixed link, etc. The external ports 240 may have the same physical interface type, such as copper ports (CAT-5E/CAT-6), multi-mode fiber ports (SX) or single-mode fiber ports (LX). In another embodiment, the external ports 240 may have one or more different physical interface types.

The external ports 240 are assigned external port interface identifiers (Port ID), e.g., device port values, such as gport and dport values, associated with the switching module 210. In an embodiment, the chassis ID of the network node 110, the MID of the switching module 210 and the external port interface identifier (Port ID) are used as a global unique identifier of a physical external port interface 240 in a network node 110 in the virtual chassis system 100. In another embodiment, globally unique module identifiers (MID) are assigned to the switching modules 210 of the network nodes in the virtual chassis system based on the chassis identifiers. For example, switching MIDs 0-31 are assigned to chassis ID=1, switching MIDs 32-63 are assigned to chassis ID=2, etc. In this case, the globally unique switching MIDs and external port identifiers (Port ID) are used as a global unique identifier of a physical external port interface 240 in a network node 110 in the virtual chassis system 100.

When a packet is received on an external port 240, switching module 210 transfers the packet to a pre-pended packet header interface (PPHI) 246 that adds a pre-pended header (or otherwise modifies the packet header) to include hardware device information (HDI) associated with the source and/or destination MAC address of the packet. In an embodiment, the pre-pended header may include other information such as packet priority and load balance identifiers. To obtain HDI information associated with the MAC address of the packet, the PPHI performs a look-up process in MAC/HDI forwarding table 250. The MAC/HDI forwarding table 250 stored in the address table memory 248 includes a list of MAC addresses and associated hardware device information. The hardware device information uniquely identifies a network node 110, switching module 210 and/or a port interface 240 for routing the packet. The hardware device information includes, for example, chassis ID, MID of a switching module 210 and/or port interface ID of a port 240 associated with the destination MAC address. The MAC/HDI forwarding table 250 may include one or more tables, such as source trunk map, trunk bitmap table, trunk group tables, VLAN mapping table, etc. In an embodiment, the MAC/HDI forwarding table 250 or parts thereof may be located in the queuing module of the NIM 152 or other module as well.

Based on the topology database 144, a VFL routing configuration table 254 is generated at a network node 110 to determine routing of unicast traffic. The VFL routing configuration table 254 includes a chassis ID and an associated VFL ID (VFID). The VFID associated with the chassis ID identifies a VFL 120 in the virtual chassis system 100 for routing the packet to a network node 110 identified by the destination chassis ID. In another embodiment, when globally unique module identifiers (MID) are assigned to the switching modules 210 of the network nodes 110 in the virtual chassis system 100, the VFL routing configuration table 254 includes the globally unique MIDs and an associated VFL ID (VFID). In an embodiment, the VFL routing configuration table 254 is generated using a shortest path algorithm, traffic based algorithm or other type of routing algorithm. An example of VFL routing configuration tables 254 for the virtual chassis system 100 shown in FIG. 1*a* is illustrated below in Table 3.

TABLE 3

| Destination Chassis ID/MID | Outgoing VFL ID | Destination Chassis ID/MID | Outgoing VFL ID |
|---|---|---|---|
| VFL Routing Configuration on Chassis 1 | | VFL Routing Configuration on Chassis 2 | |
| 1 (MID = 0-31) | N/A (local) | 1 (MID = 0-31) | 0 |
| 2 (MID = 32-63) | 3 | 2 (MID = 32-63) | N/A (local) |
| 3 (MID = 64) | 2 | 3 (MID = 64) | 3 |
| 4 (MID = 65-97) | 2 or 1 | 4 (MID = 65-97) | 3 or 1 |
| 5 (MID = 98) | 1 | 5 (MID = 98) | 1 |
| 6 (MID = 99-115) | 0 | 6 (MID = 99-115) | 0 or 1 |
| VFL Routing Configuration on Chassis 3 | | VFL Routing Configuration on Chassis 4 | |
| 1 (MID = 0-31) | 1 | 1 (MID = 0-31) | 0 or 1 |
| 2 (MID = 32-63) | 0 | 2 (MID = 32-63) | 0 or 1 |
| 3 (MID = 64) | N/A (local) | 3 (MID = 64) | 1 |
| 4 (MID = 65-97) | 3 | 4 (MID = 65-97) | N/A (local) |

TABLE 3-continued

| Destination Chassis ID/MID | Outgoing VFL ID | Destination Chassis ID/MID | Outgoing VFL ID |
|---|---|---|---|
| 5 (MID = 98) | 3 or 2 | 5 (MID = 98) | 0 |
| 6 (MID = 99-115) | 2 | 6 (MID = 99-115) | 0 or 1 |
| VFL Routing Configuration on Chassis 5 | | VFL Routing Configuration on Chassis 6 | |
| 1 (MID = 0-31) | 2 | 1 (MID = 0-31) | 0 |
| 2 (MID = 32-63) | 1 | 2 (MID = 32-63) | 0 or 1 |
| 3 (MID = 64) | 1 or 0 | 3 (MID = 64) | 1 |
| 4 (MID = 65-97) | 0 | 4 (MID = 65-97) | 1 or 2 |
| 5 (MID = 98) | N/A (local) | 5 (MID = 98) | 2 |
| 6 (MID = 99-115) | 1 | 6 (MID = 99-115) | N/A (local) |

Though the MAC/HDI forwarding table 250 and VFL routing table 254 are illustrated as separate tables in address table memory 248, the tables may be combined or data included from one of the tables into the other table or the tables may be separated into one or more other tables.

In an embodiment, the hardware device information HDI in the pre-pended header of a packet includes the outgoing VFID for the VFL port 252 associated with the destination chassis ID, as shown in Table 3. The pre-pended header also includes hardware device information HDI associated with the source port receiving the packet, such as the port interface ID, MID of the switching module 210 and chassis ID. Additional information, such as VLAN ID, packet type (multicast, unicast, broadcast), packet priority and load balance identifier is also added to the pre-pended header in an embodiment.

The packet with the pre-pended header is then transmitted to the queuing module 212 for routing over the fabric switch 214. Based on the VFL routing configuration table 254, the queuing module 212 routes the packet with the pre-pended header to the switching module 210 connected to the outgoing VFL 120.

The queuing module 212 includes a packet buffer 260, a queue management 262 for providing traffic and buffer management and a global HDI address table 264. The global HDI address table 264 maps the outgoing VFL ID to the appropriate queues in queuing modules 212 in one or more of the other NIMs 152. For example, the queuing module 212 switches the packet to an appropriate egress queue for one or more of the VFL port interfaces 252 for transmission over the outgoing VFL 120. In an embodiment, a determination of the egress queue corresponding to a particular VFL port interface is operably based on a load balance identifier in the pre-pended header.

Though the switching module 210 and queuing module 212 are illustrated as separate integrated circuits or modules, one or more functions or components of the modules may be included on the other module or combined into an alternate module or otherwise be implemented in one or more integrated circuits.

FIG. 6 illustrates a schematic block diagram of an embodiment of a pre-pended header of a packet in the virtual chassis system 100. The pre-pended header 300 includes fields for source HDI 302, destination HDI 304, VLAN ID 306, packet type 308, source MAC address 310 and destination MAC address 312. In an embodiment, the pre-pended header may also include, load balance identifier 314 and packet priority 316. The destination HDI 304 includes, for example, the port identifier (either device port (dport) and/or global port value (GPV)), MID of switching module 210 and/or chassis ID of the destination network node 110 associated with the destination MAC address. The source HDI 302 includes, for example, the port identifier (either device port (dport) and/or global port value (GPV)), MID of switching module 210 and/or chassis ID of the source network node associated with the source MAC address. The load balance identifier 314 is utilized by the queuing module 212 to determine a VFL member port for transmission of the packet over the outgoing VFL 120. The packet priority 316 is utilized by the queuing module 212 to determine the specific priority queue.

Figure 7:
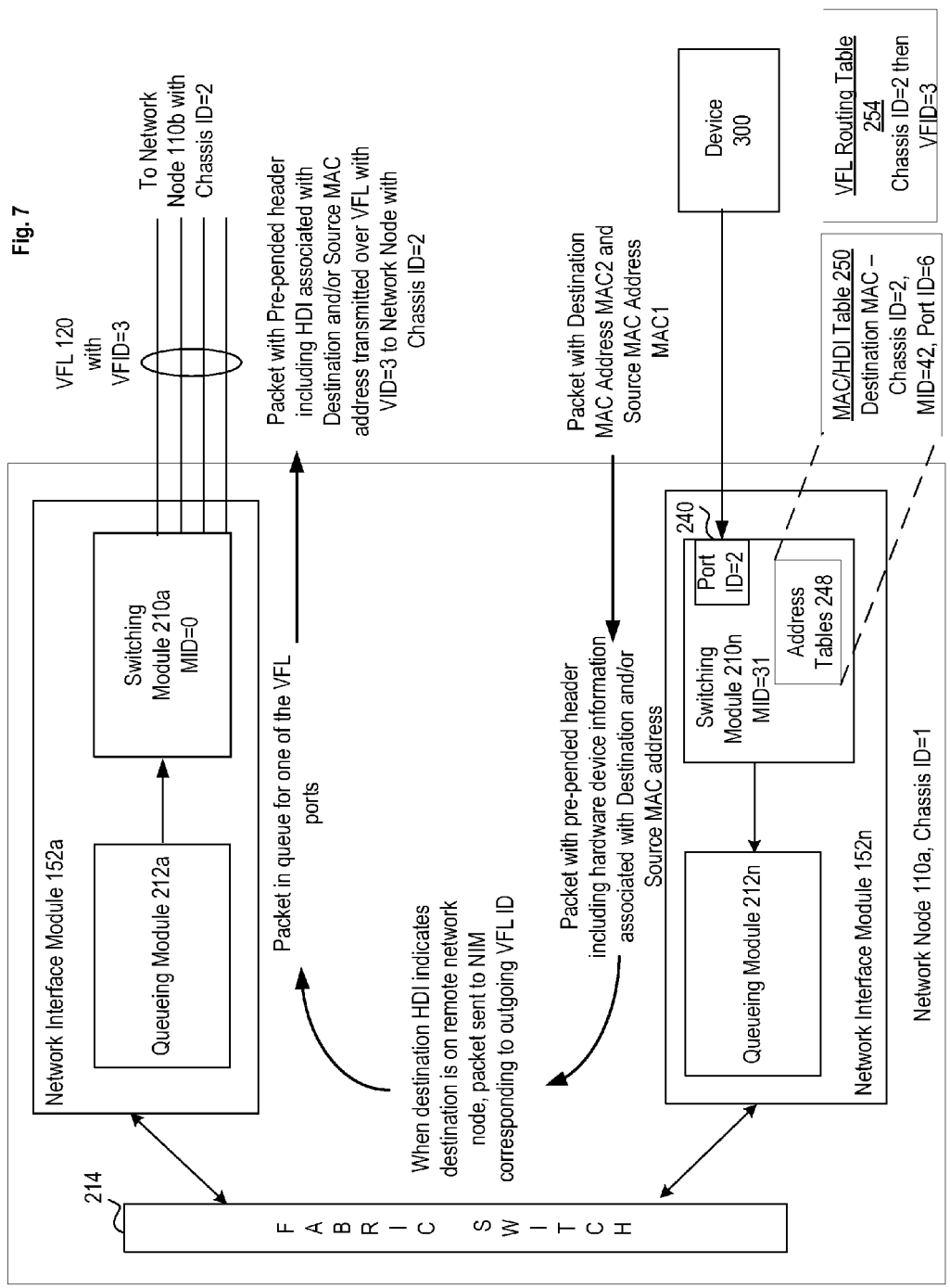
FIG. 7 illustrates a schematic block diagram of an embodiment of packet flow through a network node in a virtual chassis system in accordance with the present invention.

FIG. 7 illustrates a schematic block diagram of an embodiment of a packet flow through a network node 110*a* to another network node 110*b* in a virtual chassis system 100. In this example, an external device 300 from the virtual chassis system 100 with source MAC address "MAC1" transmits a packet with a destination MAC address "MAC2". Network node 110*a*, with Chassis ID=1 in this example, receives the packet at external port interface 240, e.g. with port ID=2 on switching module 210*n*, e.g. with MID=31. The switching module 210*n* extracts the destination MAC address MAC2 and performs an address table look-up in MAC/HDI forwarding table 250 to determine hardware device information (HDI) associated with the destination MAC address MAC2. The destination HDI may include, e.g., destination chassis ID and device module identifier (MIDs) and port identifiers associated with the destination MAC address. The destination HDI may also include identifiers of one or more other network nodes or hardware modules in a path to the destination device associated with the destination MAC address. When the destination MAC address is associated with another network node, e.g. destination chassis ID is not the local chassis ID, the switching module 210 determines an outgoing VFL ID associated with the destination chassis ID. The outgoing VFL ID may be added to the destination HDI in the pre-pended header. For the example in FIG. 5, the VFL routing table 254 indicates that the destination chassis ID=2 is associated with VFL 120 having VFID=3.

The switching module 210*n* also includes in the prepended header source hardware device information (HDI) associated with the originating external port interface, e.g. port ID=2. The source HDI may include one or more hardware device identifiers, such as MID of the originating switching module 210, source port identifier, MID for source NIM 152, source chassis ID, etc. Furthermore, in an embodiment, the pre-pended header includes a packet priority and a load balance identifier determined based on parameters retrieved from the original packet (source MAC address, destination MAC address, source IP address, destination IP address).

The packet with pre-pended header is transmitted to the queuing module 212*n* which then determines a NIM 152 on the network node 110 to transmit the packet based on the destination HDI. When the destination HDI indicates a local external port interface on the network node (e.g. based on the destination MID contained in the pre-pended header), the queuing module places the packet in an egress queue for transmission to the corresponding NIM 152 of the local external port interface. In another example illustrated in FIG. 5, when the destination HDI indicates that the packet needs to be transmitted over a VFL 120 to another network node 110 in the virtual chassis system 100, the queuing module determines from the VFL ID the outgoing NIM 152 to transmit the packet. In this example, the queuing module determines that VFID=3 is operably coupled to NIM 152*a* and transmits the packet with pre-pended header over the fabric switch 214 to NIM 152*a*. When multiple switching modules 210 are operably coupled to the outgoing VFL 120, the traffic to be transmitted may be distributed between the multiple switching modules 210 in a load balancing method. In addition, the selection of a VFL member port (high priority queue, low priority, etc.) on a switching module 210 is operably based on load balance identifier parameters carried on the pre-pended header. The queuing module 212a on NIM 152a receives the packet with pre-pended header and queues the packet for transmission over VFL 120 with VFID=3. The switching module 210a then transmits the packet with pre-pended header including the source and/or destination HDI to the network node 110b, chassis ID=2 over the VFL 120 with VFID=3.

In an embodiment, the switching module 210a may alter the pre-pended header prior to transmission over the VFL 120. For example, the switching module 210a may translate a destination HDI with local significance (e.g., a gport value or local hardware device identifier MID) to an HDI with global significance or remove the outgoing VFID from the pre-pended header.

In an embodiment, the MAC/HDI forwarding tables 250 in the NIMs 152 are populated and updated in response to layer 2 packet flows through the virtual chassis system 100. Since the pre-pended header includes source MAC address and source HDI information, the NIMS 152, e.g. in specific the switching modules 210 in an embodiment, are able to populate the MAC/HDI forwarding table 250 with this information. By operating in a pre-pended header mode to exchange Layer 2 packets with source MAC addresses and source HDI over the VFL 120, the switching modules 210 are able to synchronize the MAC/HDI forwarding tables 250 between the network modules 110 in a virtual chassis system 100. Though the MAC/HDI forwarding table 250 and VFL routing table 254 are described as located in the switching modules 210, the tables may be included, alternatively or in addition to, in the queuing modules 212n or other module of the network node 110. In another embodiment, the CMM 150 (primary and secondary) may also include the MAC/HDI forwarding table 250 and VFL routing table 254.

Figure 8:
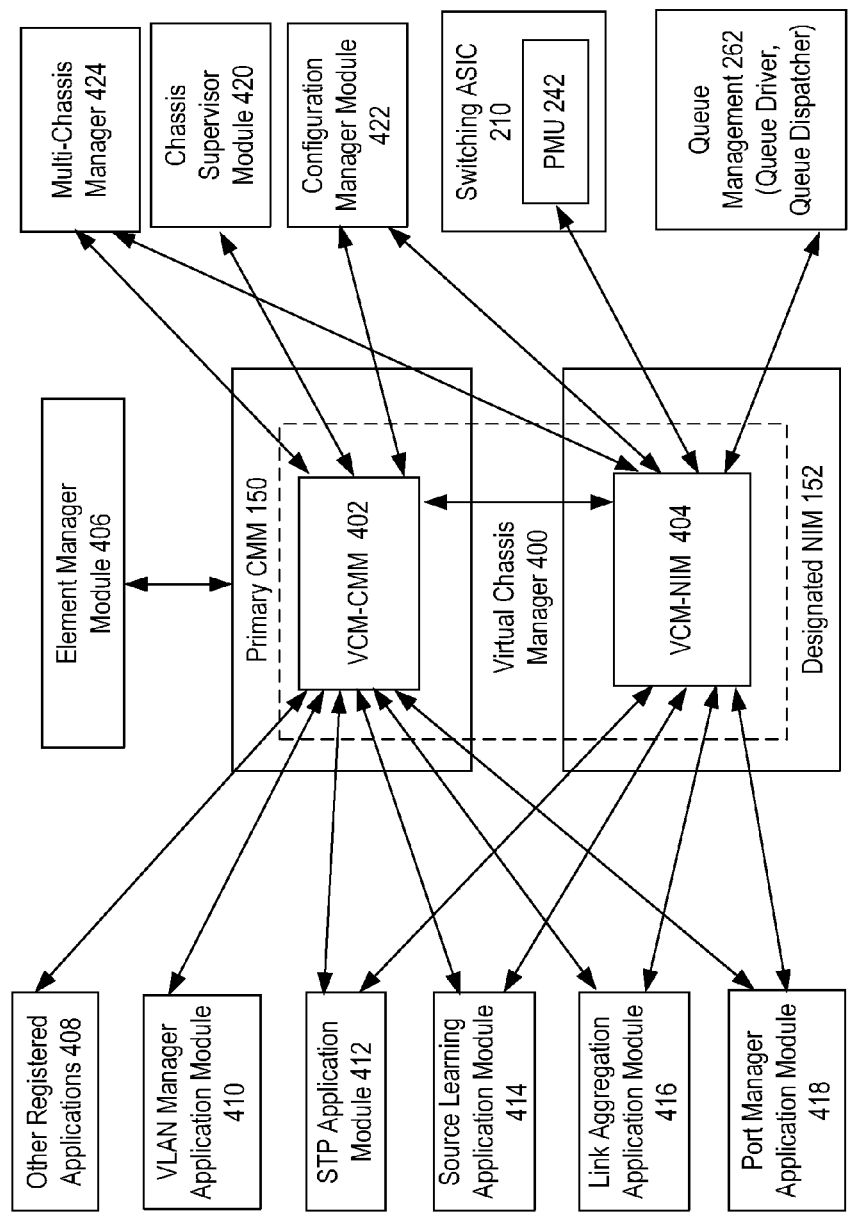
FIG. 8 illustrates a schematic block diagram of an embodiment of a virtual chassis manager application in accordance with the present invention.

FIG. 8 illustrates a schematic block diagram of an embodiment of a virtual chassis manager application or module 400 operable in the network nodes 110 in the virtual chassis system 100. In an embodiment of a network node 110 with a multi-slot chassis based node architecture, the virtual chassis manager module 400 includes a distribution of functionality between the central management module (CMM) 150 of the network node 110 (called VCM-CMM 402) and a processing module 266 in a designated network interface module (NIM) 152 of the network node (called VCM-NIM 404). In a stackable node architecture, a designated or master stackable network element 140 operates the VCM-NIM 404. Use of a designated NIM 152 or stackable element 140 avoids centralizing the functions of the VCM module 400 only at a CMM 150. An example of a distribution of functionality of the virtual chassis manager module 400 is shown in Table 4.

TABLE 4

| VCM-CMM 402 | VCM-NIM 404 |
|---|---|
| Element and network management interface to the virtual chassis functionality Coordination of the virtual chassis operation and states from a network node overview | Control protocol state machines Service interfaces with other software components, i.e. interfaces used by the VCM module 400 to provide or request services to/from other software components. Programming of the underlying switching module devices: global module identifiers (MID), loop prevention, virtual chassis inter-process communication infrastructure, VFL member port programming, etc. |

In an embodiment, the VCM-CMM 402 includes an interface between the virtual chassis manager module 400 and element and/or network manager module 406 as well as an interface to other applications 408 registered with VCM module 400 operable on the network node 110. The virtual chassis manager module 400 informs the registered applications 408 when to operate in the virtual chassis mode. More generally, the virtual chassis manager module 400 provides a wide range of notifications to inform interested applications about the status of the virtual chassis system both in the context of the local node and other network nodes 110 in the virtual chassis system 100. Some of the status information is driven by management configuration, whereas other status information is triggered by runtime decisions taken by the network node individually or by a plurality of the network nodes 110 within the virtual chassis system upon control data exchange, negotiation and agreement. The virtual chassis manager module 400 also interfaces with the VLAN Manager Application module 410, Spanning Tree Protocol (STP) application module 412, Source Learning application module 414, Link Aggregation application module 416 and Port Manager application module 418 for the purposes of requesting services from these system components. For example, the VCM 400 may request VLAN Manager to configure a VFL member port as a member of the control VLAN in order to allow the set-up of an inter-process communication channel between the network nodes 110 in the virtual chassis system 100.

The VCM-NIM 404 performs module identification configuration (e.g. MID) of hardware modules. The VCM-NIM 404 also interfaces with the queue management 262 in queuing modules 212 to perform hardware device/queue mapping functions and inter-chassis loop avoidance functions. The VCM-NIM 404 also includes virtual chassis state functionality for the control and management of the VFLs 120. Virtual Fabric Link Control manages and configures the VFLs 120 and interfaces with the port manager application module 418 to monitor and/or control the state of the VFLs 120 and their corresponding member ports. It also tracks and updates the status of the VFLs 120. The VCM-NIM 404 tracks the state of each VFL member port using the standard LACP protocol, or other similar protocol, along with the state of the link at the physical level. In addition to the LACP protocol, a virtual chassis status protocol performs periodic keep-alive checks (hello protocol) in order to check the status and/or operability of components running on the designated NIM on both virtual-chassis switches. All virtual chassis protocol packets must be assigned a high priority in the system to avoid false/premature failure detection because such a premature detection of failure may have a very disruptive effect in the system. By running the virtual chassis status protocol on a primary designated NIM 152, the back-up designated NIM module is able to assume control of the status protocol processing in the event of failure.

The VCM-CMM 402 and the VCM-NIM 404 register with port manager application module 418 to receive port state and link state events about the member ports and links of the VFLs 120. In another embodiment, the virtual chassis manager module 400 may include a port manager application module to monitor the port and link state of the VFLs 120. The virtual chassis manager module 400 tracks the operational state of VFLs 120 and processes events about the VFL status, i.e. aggregate created/deleted/up/down. The port manager application module 418 provides link state notifications to both the VCM-CMM 402 and VCM-NIM 404.

In an embodiment, a transport control protocol is implemented in a virtual chassis system 100 to transport control protocol packets between designated NIMs 152 or stackable network elements 140 of network nodes 110. The transport control protocol is operable in the network nodes 110 with different node architectures. For a multi-slot chassis based node architecture, a designated NIM 152 with a designated processing module 266 operates the transport control protocol, e.g. as part of the VCM-NIM 404. In a stackable node architecture, a designated or master stackable network element 140 operates the transport control protocol.

Chassis supervisor module 420 provides an interface to hardware of the network node 110 and controls monitoring and boot-up or restart of the various application modules, controls software reloads and software upgrades (such as in-service software upgrades ISSUs), providing a command line interface (CLI) for the element manager module 406 and controls access to status or image files of system of the network node 110. During virtual chassis mode, the chassis supervisor module 420 controls boot sequence, controls software reloads and ISSUs and provides an interface for accessing virtual chassis parameters.

Configuration manager module 422 is operable to convert operation of the network node 110 from a virtual chassis mode to a standalone mode or convert a network node 110 from a standalone mode to a virtual chassis mode. Configuration manager module is also operable to configure the virtual chassis manager module 400 and multi-chassis manager module 424. The operation of the configuration manager module 422 and operation states of a network node 110 are described in more detail below.

The network nodes 110 in a virtual chassis system 100 may operate in a plurality of operation modes, including virtual chassis mode, standalone mode and multi-chassis (MC-LAG) mode. Various parameters and configurations are modified depending on the operation mode. Table 5 illustrates the assignment of chassis IDs to network nodes 110 depending on the mode of operation.

TABLE 5

| Operation Mode | Minimum Chassis ID | Maximum Chassis ID |
| --- | --- | --- |
| Standalone | 0 | 0 |
| Multi-Chassis (MCLAG) | 1 | 2 |
| Virtual-Chassis | 1 | N |

In standalone mode, a network node 110 is operated as a single node and utilizes its configured local MAC address rather than a global Virtual Chassis MAC address. In multi-chassis mode, two network nodes are configured as virtual nodes whose MAC forwarding tables and ARP tables are synchronized, but they still operate as separate bridges and routers, each of them using their own local chassis MAC address, as described in more detail in U.S. patent application Ser. No. 13/010,168, entitled, "SYSTEM AND METHOD FOR MULTI-CHASSIS LINK AGGREGATION," filed Jan. 20, 2011. In virtual chassis mode as described herein, a plurality N of network nodes are configured as virtual chassis nodes in a virtual chassis system 100. A globally unique chassis ID from 1 to N is assigned to each of the plurality of network nodes in the virtual chassis system 100.

When a network node 110 operates in standalone mode, port identifiers and configurations follow a format: 0/<slot>/<port>, where the chassis ID equals "zero", slot identifies each Network Interface Module (NIM) 152 in a multi-slot architecture or stackable network element 140 and port is the port interface identifier. When a network node 110 operates in multi-chassis mode, port configurations follow a format: <chassis>/<slot>/<port>, where the chassis ID equals 1 or 2 and represents the operation/current/running chassis ID.

When a network node 110 operates in virtual chassis mode, port configurations follow a format: <chassis>/<slot>/<port>, where the chassis ID is a number in the range 1, 2 ... N and represents the operation/current/running chassis ID.

In a virtual chassis system 100, when failures are detected that lead to a loss of communication with the master network node 110, a split or fracture occurs in the virtual chassis system 100. The topology of the virtual chassis system 100, and therefore the services that it provides, can be severely impacted when the network nodes 110 in a virtual chassis system are split into two or more subsets. This condition is referred to as a virtual chassis split or fracture. When a virtual-chassis topology is split, the virtual chassis system 100 faces problems ranging from duplicate MAC addresses, duplicate configurable resources (e.g. IP interfaces), connectivity loss, loss of management access, and instabilities due to multiple node reset events.

A virtual-chassis split can typically be triggered by a failure in one or more of the network nodes 110, such as power failure, hardware/software malfunction, in service software upgrades, etc. A virtual chassis split can also be triggered by one or more of the VFLs 120 coupling the network nodes 110 becoming inoperable, e.g. the VFL 120 is physically severed, removed, administratively brought down, or brought down due to hardware/software malfunction related to a module that hosts such links or the links themselves. In an embodiment, upon occurrence of a virtual-chassis split between two subsets of a virtual chassis network 100, a first subset of the network nodes 110 is no longer able to communicate with the master network node in the second subset. The remaining active network nodes in the first subset elect a new master network node. In an embodiment, the remaining active network nodes retain the master MAC address of the failed master network node. In another embodiment, the remaining active network nodes adopt the local MAC address of the newly elected master network node as the new Virtual Chassis MAC address of the virtual chassis system 100.

Figure 9:
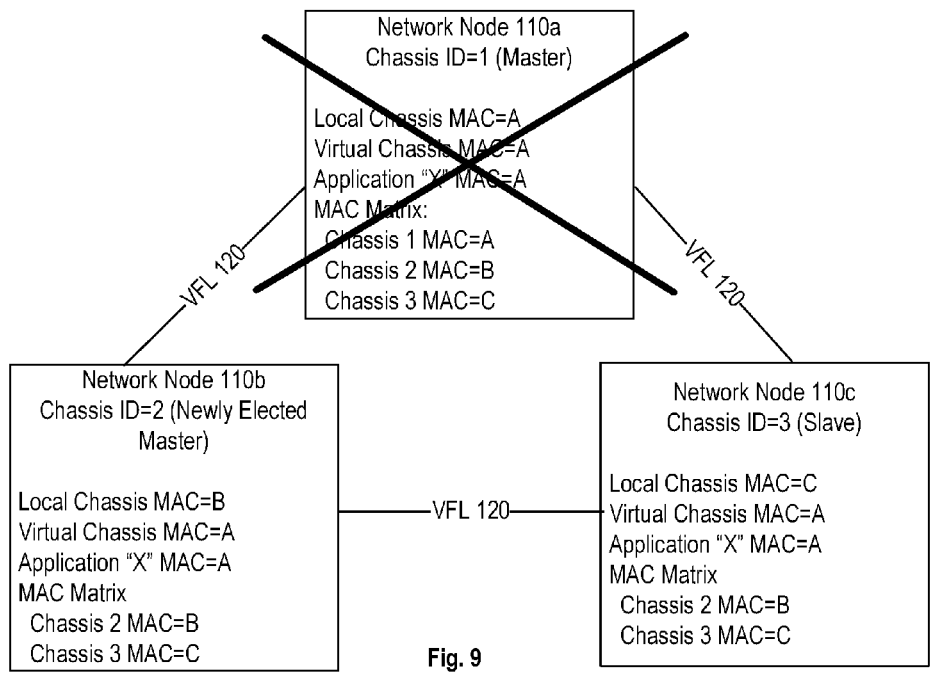
FIG. 9 illustrates a schematic block diagram of an embodiment of master address retention in a virtual chassis system in accordance with the present invention.

FIG. 9 illustrates a schematic block diagram of an embodiment of master address retention in a virtual chassis system 100. Due to a malfunction or schedule power down maintenance or an inoperable VFL 120 link or other failure, master network node 110a is not able to communicate with the remaining nodes 110b, 110c in the virtual chassis system 100. The remaining network nodes 110b and 110c elect a new master network node, in this example, network node 110b. In this embodiment, the remaining network nodes 110b and 110c retain the MAC address of the prior master network node 110a as the virtual chassis MAC address for the virtual chassis system 100. The prior master network node 110a is removed from the topology database 144 and MAC matrix of the remaining active network nodes 110b and 110c. This embodiment is termed master MAC retention due to the retention of the prior master MAC address as the virtual chassis MAC address by the remaining active network nodes 110.

Figure 10:
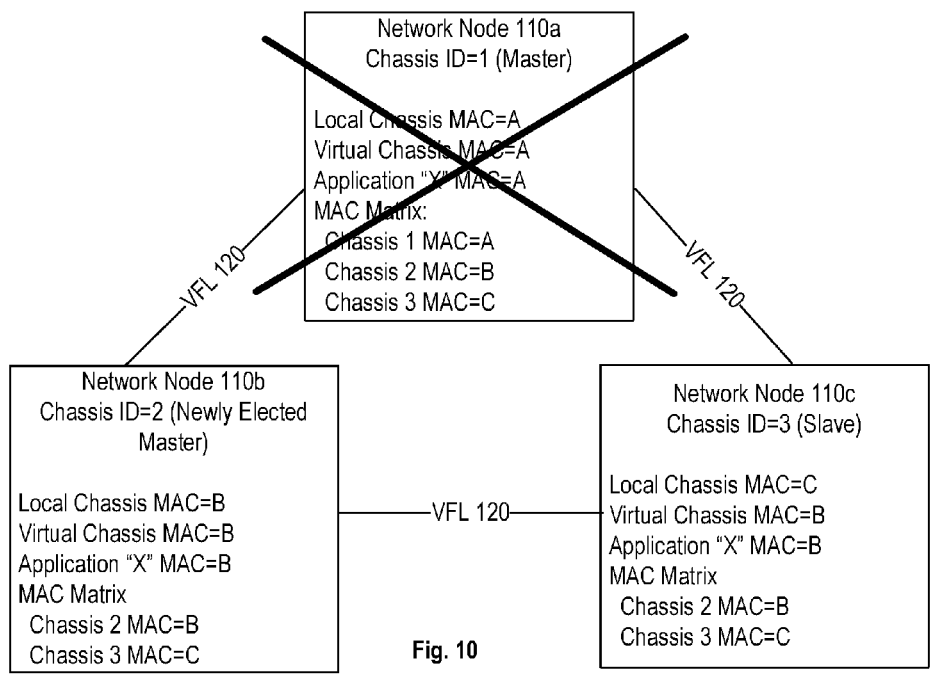
FIG. 10 illustrates a schematic block diagram of an embodiment of master address release in a virtual chassis system in accordance with the present invention.

FIG. 10 illustrates a schematic block diagram of an embodiment of master address release in a virtual chassis system 100. Due to a malfunction or schedule power down maintenance or an inoperable VFL 120 link or other failure, master network node 110a is not able to communicate with the remaining nodes in the virtual chassis system 100. The remaining network nodes 110b and 110c elect a new master network node, in this example, network node 110b. In this embodiment, the remaining network nodes 110b and 110c release the MAC address of the prior master network node 110a as the virtual chassis MAC address. The remaining active network nodes 110*b* and 110*c* adopt the local MAC address of the newly elected master network node 110*b* as the virtual chassis MAC address for the virtual chassis system 100. The prior master network node 110*a* is removed from the topology database and MAC matrix of the remaining active network nodes 110*b* and 110*c*. This embodiment is termed master MAC release due to the release of the inactive prior master MAC address as the virtual chassis MAC address.

The remaining network nodes 110 determine to retain or release the MAC address of the inactive master network element based on one or more factors. For example, one factor is whether the MAC retention function is administratively enabled. Another factor is whether the change in status of the master network node causes a virtual-chassis split in the system, e.g. the master network node and/or one or more other nodes are still operating using the MAC address of the failed prior master network node. A discovery or monitoring protocol or other type of control protocol is used to determine the topology before and after the failure of the master network node to determine whether a split in the virtual chassis system has occurred. When a split in the virtual chassis system has occurred, e.g., the newly elected master network node determines that the prior master network node and/or one or more other nodes are still operating, it releases the prior master MAC address as the virtual chassis MAC address. The newly elected master network node may also transition the user ports to a blocking state to prevent duplicative operation of two MAC addresses as the virtual chassis MAC address.

Figure 11:
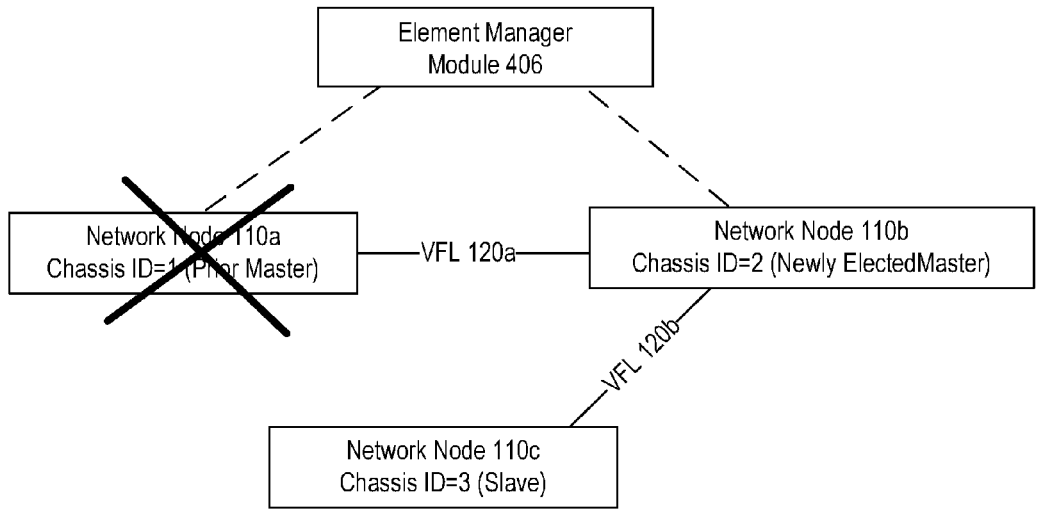
FIG. 11 illustrates a schematic block diagram of an embodiment of master network node failure in a virtual chassis system in accordance with the present invention.

FIG. 11 illustrates a schematic block diagram of an embodiment of master network node failure in a virtual chassis system 100. In this example, the master network node 110*a* fails and is inoperable. The newly elected master network node 110*b* attempts to determine the status of the prior master network node 110*a* by performing one or more protocols (Hello protocol, ping, etc.) or may request a status update of the network node 110*a* from element manager module 406. The newly elected master network node 110*b* attempts to distinguish between a failure of the VFL link 120*a* or a failure of the prior master network node 110*a*. When newly elected master network node 110*b* determines that a failure of the prior master network node 110*a* has occurred, e.g. it is no longer operable, the newly elected master network node 110*b* retains the MAC address of the prior master network node 110*a* as the virtual chassis MAC address as shown in FIG. 9. When the prior master network node 110*a* is removed from the active topology database 144 and the newly elected master network node 110*b* retains the prior master's MAC address, chassis supervisor module 420 starts a MAC retention timer. The MAC retention timer is configurable and sets a predetermined time period for the prior master network node 110*a* to reset and become active. Upon expiration of the predetermined time period, a warning message is generated by the newly elected master network node 110*b* if the prior master network node 110*a* is still inoperable. The virtual chassis system manager may determine to issue a user command to release the retained MAC address and adopt the local MAC address of the newly elected master network node 110*b* as the virtual chassis MAC address for the virtual chassis system 100.

Figure 12:
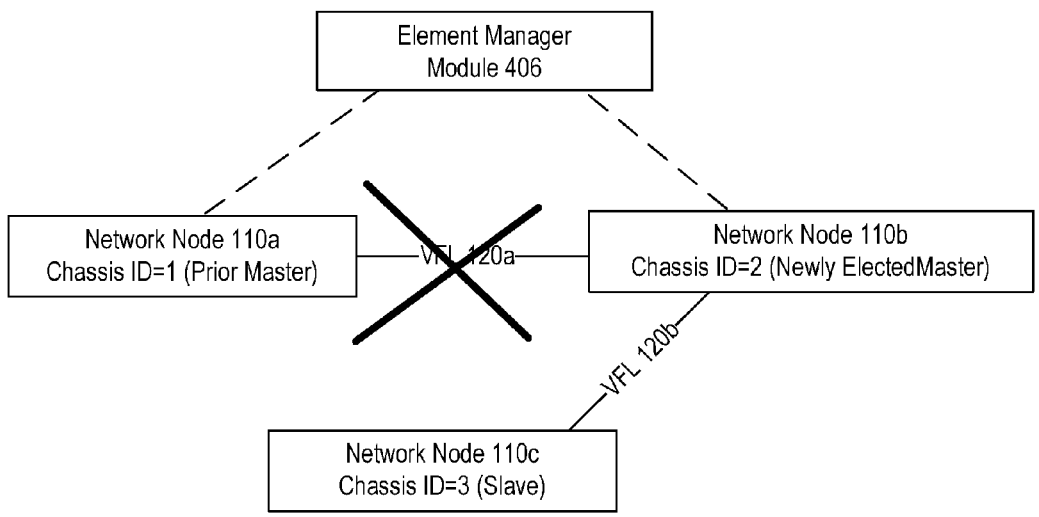
FIG. 12 illustrates a schematic block diagram of an embodiment of VFL failure in a virtual chassis system in accordance with the present invention.

FIG. 12 illustrates a schematic block diagram of an embodiment of VFL failure in a virtual chassis system 100. In this example, the VFL 120*a* coupled to the master network node 110*a* fails while prior master network node 110*a* remains operable. The newly elected master network node 110*b* attempts to determine the status of the prior master network node 110*a* by performing one or more protocols (Hello protocol, ping, etc.) or may request a status update of the network node 110*a* from element manager module 406.

The newly elected master network node 110*b* attempts to distinguish between a failure of the VFL link 120*a* or a failure of the prior master network node 110*a*. When newly elected master network node 110*b* determines that a failure of the VFL 120*a* has occurred but that the prior master network node 110*a* is operable, the newly elected master network node 110*b* releases the MAC address of the prior master network node 110*a* as shown in FIG. 10. The remaining active network nodes 110*b* and 110*c* adopt the local MAC address of the newly elected master network node 110*b* as the virtual chassis MAC address for the virtual chassis system 100. In addition, the newly elected master network node 110*b* transitions user ports to a blocking state to prevent duplicative operation of two MAC addresses as the virtual chassis MAC address. The release of the MAC address of the prior master network node 110*a* also affects other layer 2 and layer 3 services. For example, spanning tree protocol and LACP may need to reconfigure and/or restart while layer 3 packets may need to be transmitted to neighboring nodes in response to the MAC address change.

Figure 13:
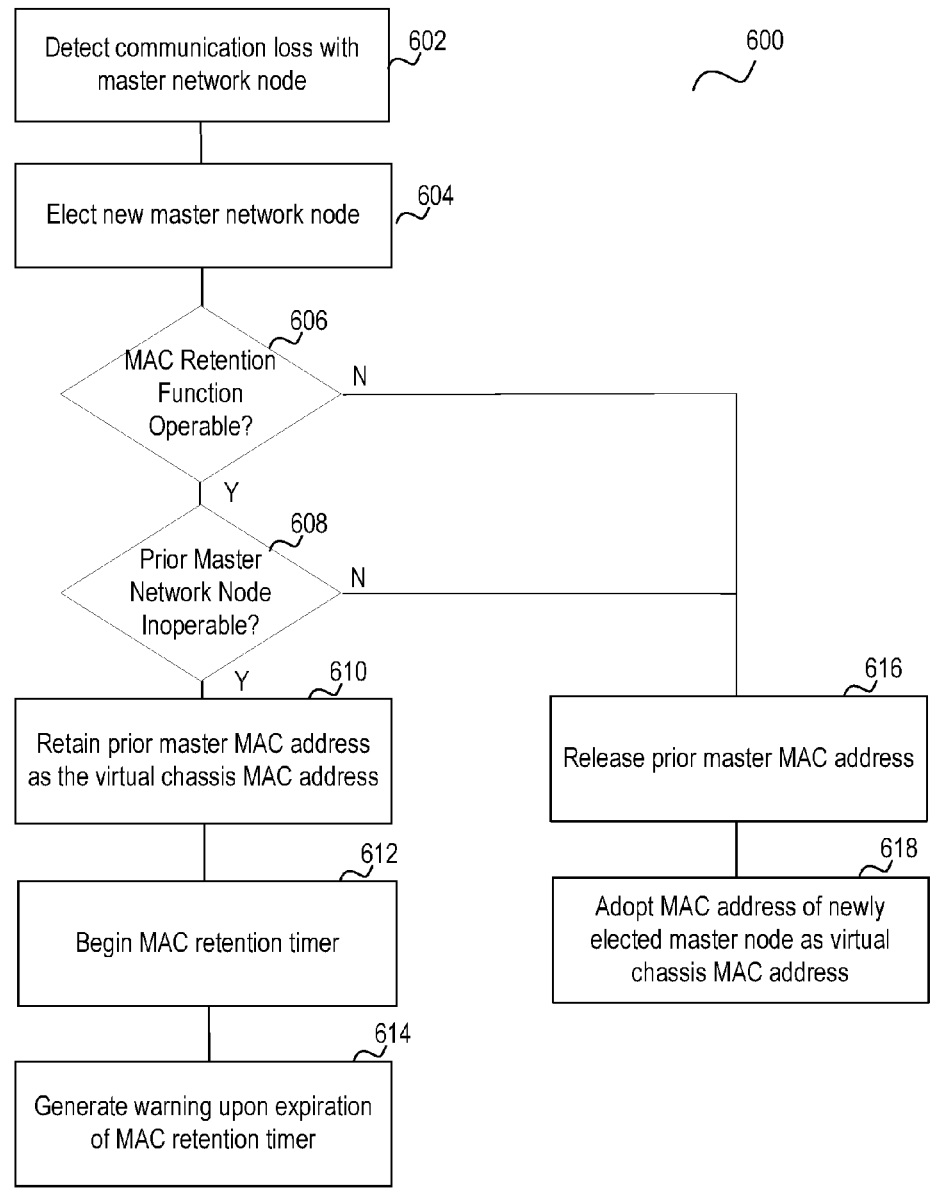
FIG. 13 illustrates a logic flow diagram of an embodiment of a method for recovery from a failure of a master network node in a virtual chassis system in accordance with the present invention.

FIG. 13 illustrates a logic flow diagram of an embodiment of a method 600 for recovery from a failure of a master network node in a virtual chassis system 100. In step 602, due to a malfunction or schedule power down maintenance or an inoperable VFL 120 link or other failure, communication loss is detected with the master network node in the virtual chassis system 100. The remaining network nodes in the virtual chassis system elect a new master network node in step 604. In step 606, the newly elected master network node determines whether a MAC retention function is enabled. If so, in step 608, the newly elected master network node determines whether the failure causes a split in the virtual-chassis system, e.g. the master network node and/or one or more other nodes are inoperable or are still operating using the prior master MAC address. When a virtual chassis split has not occurred, the remaining network nodes retain the MAC address of the prior master network node 110*a* as the virtual chassis MAC address for the virtual chassis system 100 in step 610. In step 612, a MAC retention timer begins to time a predetermined time period. Upon expiration of the predetermined time period in step 614, a warning message is generated by the newly elected master network node if the prior master network node 110*a* is still inoperable.

When the newly elected master network node determines that a virtual chassis split has occurred, e.g. the prior master network node is still operating in step 608, or that a MAC retention function is disabled in step 606, it releases the MAC address of the prior master network node as the virtual chassis MAC address in step 616. The remaining active network nodes adopt the local MAC address of the newly elected master network node as the virtual chassis MAC address for the virtual chassis system 100 in step 618.

The topology of a virtual chassis system, and therefore the services that it provides to the end users, can be severely impacted when a virtual chassis split occurs. When a virtual chassis topology is split, the system faces many problems ranging from duplicate MAC addresses, duplicate configurable resources (e.g. IP interfaces), connectivity loss, loss of management access, and instabilities due to multiple switch reset events. A virtual-chassis split can typically be triggered by a failure in one or more of the network nodes 110, such as power failure, hardware/software malfunction, in service software upgrades, etc. A virtual chassis split can also be triggered by one or more of the VFLs 120 becoming inoperable, e.g. the VFL 120 is physically severed, removed, administratively brought down, or brought down due to hardware/ software malfunction related to a module that hosts such links or the links themselves. One reason for a virtual chassis split includes an administrative action, such as the issuance of a management command, which resets or shuts down part of the virtual chassis system resulting in a split of the topology. Other administrative actions that may trigger a virtual chassis split include inconsistent configuration of parameters such as a) Configuring different control VLANs on distinct network nodes within the virtual chassis topology; b) Configuring different hello interval on distinct network nodes within the virtual chassis topology; c) Configuring different chassis groups on distinct network nodes within the virtual chassis topology. Since a virtual chassis system 100 supports a plurality of network topologies and the network nodes can be geographically apart, it can be difficult to anticipate the impact of an administrative action.

In an embodiment, a method and apparatus in a network node 110 provides warnings to help prevent a virtual chassis split event that results directly or indirectly from an administrative action in the virtual chassis system 100. For example, administrative actions that may lead directly or indirectly to a virtual chassis split include, inter alia, resetting a network node, resetting a network interface module 152 that hosts one or more VFLs 120, bringing down a VFL 120, setting a network node 110 into a shutdown/out-of-service state and configuring inconsistent parameters on different network nodes 110. In addition, other indirect events that result from an administrative action that may lead directly or indirectly to a virtual chassis split include, inter alia, a switch is reset in response to an ISSU (In Service Software Upgrade) operation and a network interface module NIM 152 that hosts one or more VFLs 120 is brought down while the system performs an ISSU operation. In an embodiment, the current topology of the virtual chassis system 100 is analyzed to determine the possible impact of one or more administrative actions. Based on this analysis, a warning is generated when an administrative action is requested that may lead directly or indirectly to a virtual chassis split.

Figure 14:
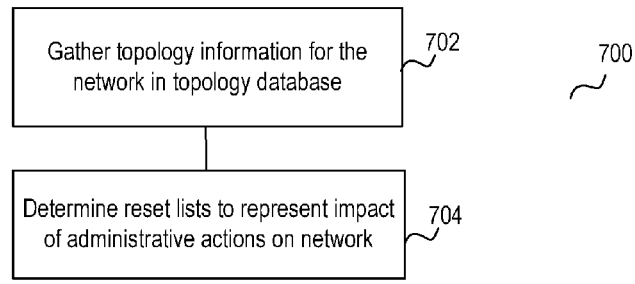
FIG. 14 illustrates a logic flow diagram of an embodiment of a method to generate one or more reset lists in the virtual chassis system in accordance with the present invention.

FIG. 14 illustrates a logic flow diagram of an embodiment of a method 700 to generate one or more reset lists in the virtual chassis system 100. In step 702, one or more control protocols are used by the network nodes to discover other network nodes 110 in the virtual chassis system 100 and to exchange topology and configuration information. The network node 110 uses the topology information to build the topology database 144 of the virtual chassis system 100 as described herein. The topology database includes, for example, the following types of topology information: identification information for the other network nodes 110 (e.g., local MAC address, chassis identifier), identification information for network interface modules NIMs 152 that host active VFLs 120 (or other active inter-switch links), identification information for the VFLs 120 and their associated member ports on the hosting network interface modules NIMs 152. The topology database 144 is maintained in the CMM 150 of the network node 110 and can also be copied to an element manager module 406 operably coupled to a network node 110 in the virtual chassis system 100. This description of the topology database 144 includes exemplary information but other information and data not described herein may also be included in the topology database. In addition, the topology database 144 may be stored in separate databases or tables or combined with other tables or databases in the network node 110.

In step 704, the topology information is analyzed to determine one or more reset lists or structures that represent the impact of one or more administrative actions on the virtual chassis system 100. For example, a network node reset list is generated that includes a list of network nodes 110 that trigger a virtual chassis split if reset alone. It may also include a list of network nodes that need to be reset at the same time to prevent a virtual chassis split in the system. A Network Interface Module Reset List is generated that includes a list of network interface modules 152 that host active VFLs 120 and a status indicating whether resetting that network interface module 152 will cause a virtual chassis split. Other reset lists and structures not specifically described herein can also be generated that represent the impact of one or more administrative actions on the virtual chassis system 100.

In an embodiment, the reset lists are accessed in response to one or more administrative actions to provide information on the possible impact of the administrative action. For example, during the processing of an administrative action, such as a management command to reload or reset a network node 110, reload or reset a network interface module NIM 152, disable a network interface module 152, shutdown a network node, perform an ISSU, disable a port interface, disable a VFL 120, etc., the reset lists are analyzed for the devices (network node, NIM or port interface) affected by the administrative action.

When the reset lists indicate that the administrative action will not cause a virtual chassis split, then the processing of the administrative action proceeds. However, when the reset lists indicate that the administrative action may cause a virtual-chassis split, then a warning is displayed. The warning includes for example, an indication that a virtual chassis split may occur in response to the administrative action. The warning may also include one or more suggestions to avoid a virtual chassis split, such as resetting the intended device (such as network node, NIM or port interface) with one or more other devices (such as network node, NIM or port interface) specified in a reset list. In another embodiment, the administrative action is blocked from being processed. The warning or another message is issued that includes a notice of nonperformance of the administrative action.

Figure 15:
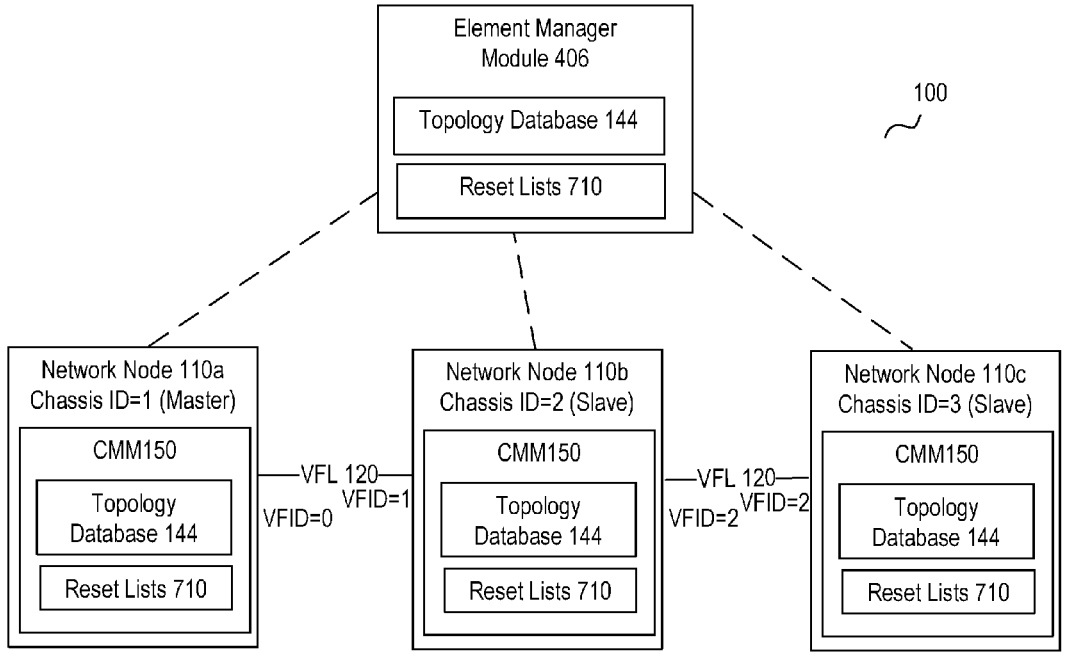
FIG. 15 illustrates a schematic block diagram of an embodiment of generation of a reset list in a virtual chassis system in accordance with the present invention.

FIG. 15 illustrates a schematic block diagram of an embodiment of generation of a reset list in a virtual chassis system 100. In this embodiment, a network node reset list is generated that provides a list of chassis identifiers of network nodes and corresponding indicators of whether a reset of the network node may cause a virtual chassis split in the virtual chassis system. A reset of the network node includes a shutdown, reboot, reset, power-off, out-of-service state, or otherwise made inoperable in response to an administrative action. For example, the administrative action may include a management command for resetting a network node, rebooting a network node, powering off a network node, setting a state of a network node 110 into a shutdown or out-of-service state or other administrative action resulting in the network node becoming inoperable. The topology information in the topology database 144 includes the available paths between the network nodes 110 in the virtual chassis system 100. In the example of FIG. 15, with the linear topology of network nodes 110a, 110b and 110c, the topology database 144 includes the following example information in Table 6 for the available paths between the network nodes 110a, 110b and 110c.

TABLE 6

| Source Network Node to Destination Network Node | Available Paths |
|---|---|
| Chassis ID = 1 to Chassis ID = 2 | Chassis ID = 1, VFL ID = 0 → Chassis ID = 2, VFL = 1 |
| Chassis ID = 1 to Chassis ID = 3 | Chassis ID = 1, VFL ID = 0 → Chassis ID = 2, VFL ID = 1 → Chassis ID = 2, VFL ID = 2 → Chassis ID = 3, VFL ID = 3 |
| Chassis ID = 2 to Chassis ID = 1 | Chassis ID = 2, VFL ID = 1 → Chassis ID = 1, VFL ID = 0 |
| Chassis ID = 2 to Chassis ID = 3 | Chassis ID = 2, VFL ID = 2 → Chassis ID = 3, VFL ID = 2 |
| Chassis ID = 3 to Chassis ID = 1 | Chassid ID = 3, VFL ID = 2 → Chassis ID = 2, VFL ID = 2 → Chassis ID = 2, VFL ID = 1 → Chassis ID = 1, VFL ID = 0 |
| Chassis ID = 3 to Chassis ID = 2 | Chassis ID = 3, VFL ID = 2 → Chassis ID = 2, VFL ID = 2 |

For this example of topology information in the virtual chassis system 100 in FIG. 15, a reset of network node 110*a* (with Chassis ID=1) will not cause a virtual chassis split in the system. Similarly, a reset of network node 110*c* (with chassis ID=3) will not cause a virtual chassis split in the system. However, a reset of network node 110*b* (with chassis ID=2) will cause a virtual chassis split in the system because a first subset of nodes (network node 110*a*) will be split or separated or unable to communicate with a second subset of nodes (network node 110*c*) in the system. In this example embodiment, to prevent a virtual chassis split, the network node reset list indicates that a combination of network nodes 110*b* and 110*c* should be reset at the same time to prevent a virtual chassis split. Table 7 below illustrates an exemplary network node reset list for this embodiment of the virtual chassis system 100.

TABLE 7

| Reset Network Node | Indicator of Virtual Chassis Split | Suggestion for Reset |
|---|---|---|
| Chassis ID = 1 | False | N/A |
| Chassis ID = 2 | True | Chassis ID = 2, 3 |
| Chassis ID = 3 | False | N/A |

The reset lists are stored in the reset list tables 710 in CMM 150 of one or more network nodes 110 in the virtual chassis system 100 and/or in an element manager module 406 operably coupled to the virtual chassis system 100. In an embodiment, the reset lists 710 are generated or stored by element manager module 406. When an administrative action is input into the element manager module, the element manager module 406 performs the analysis of the reset lists 710 and determines whether to issue a warning for the administrative action. The element manager module 406 includes a locally coupled device or remote device to one or more of the network nodes 110. In another embodiment, the CMM 150 of one or more network nodes 110 in the virtual chassis system 100 generates or stores the reset lists 710. When an administrative action is received by the CMM 150 of a network node 110, the CMM 150 accesses the reset lists 710 and determines whether to issue a warning for the administrative action.

Figure 16:
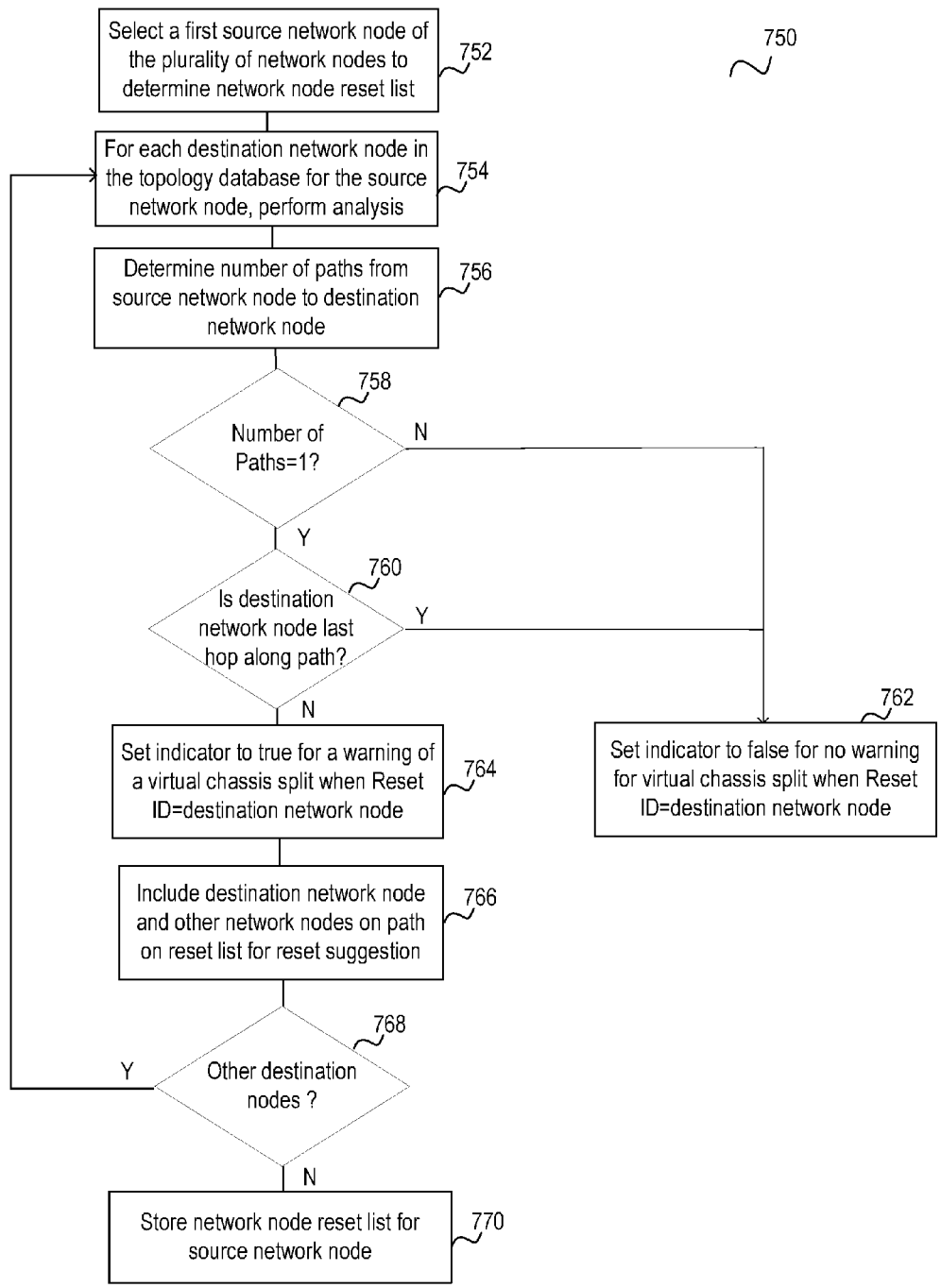
FIG. 16 illustrates a logic flow diagram of an embodiment of a method for generating the network node reset list in the virtual chassis system in accordance with the present invention.

FIG. 16 illustrates a logic flow diagram of an embodiment of a method 750 for generating the network node reset list in the virtual chassis system 100. The analysis is performed for the plurality of network nodes 110 in the virtual chassis system 100. In step 752, one of the network nodes 110 of the plurality of network nodes 110 (e.g., the source network node) is selected for analysis. In step 754, the topology information in the topology database 144 is accessed to determine a first destination node from the source network node. The number of paths between the source node and the destination node is determined in step 756 from the topology information in the topology database 144. When the number of paths is greater than 1 in step 758, then the warning status for virtual chassis split is false for Reset ID=destination network node in step 762. Since multiple paths exist, resetting the destination node will not split or isolate the source network node from the virtual chassis system 100. When the number of paths is equal to 1 in step 758 and the destination node is the last hop along the path in step 760, then the warning status for a virtual chassis split is false for Reset ID=destination network node in step 762. When the number of paths is equal to 1 in step 758 and the destination node is not the last hop along the path in step 760, then the warning indicator for virtual chassis split is set to true for Reset ID=destination network node in step 764. In step 766, the analysis determines the other nodes on the path between the source network node and the destination network node. The destination network node and the other network nodes are listed as a suggestion for resetting at the same time on the network node reset list to avoid a virtual chassis split. In step 768, it is determined whether other destination nodes need to be analyzed. If yes, then the process continues at step 754. If no additional destination nodes need to be analyzed, then the network node reset list for the source network node is stored in step 770.

Figure 17:
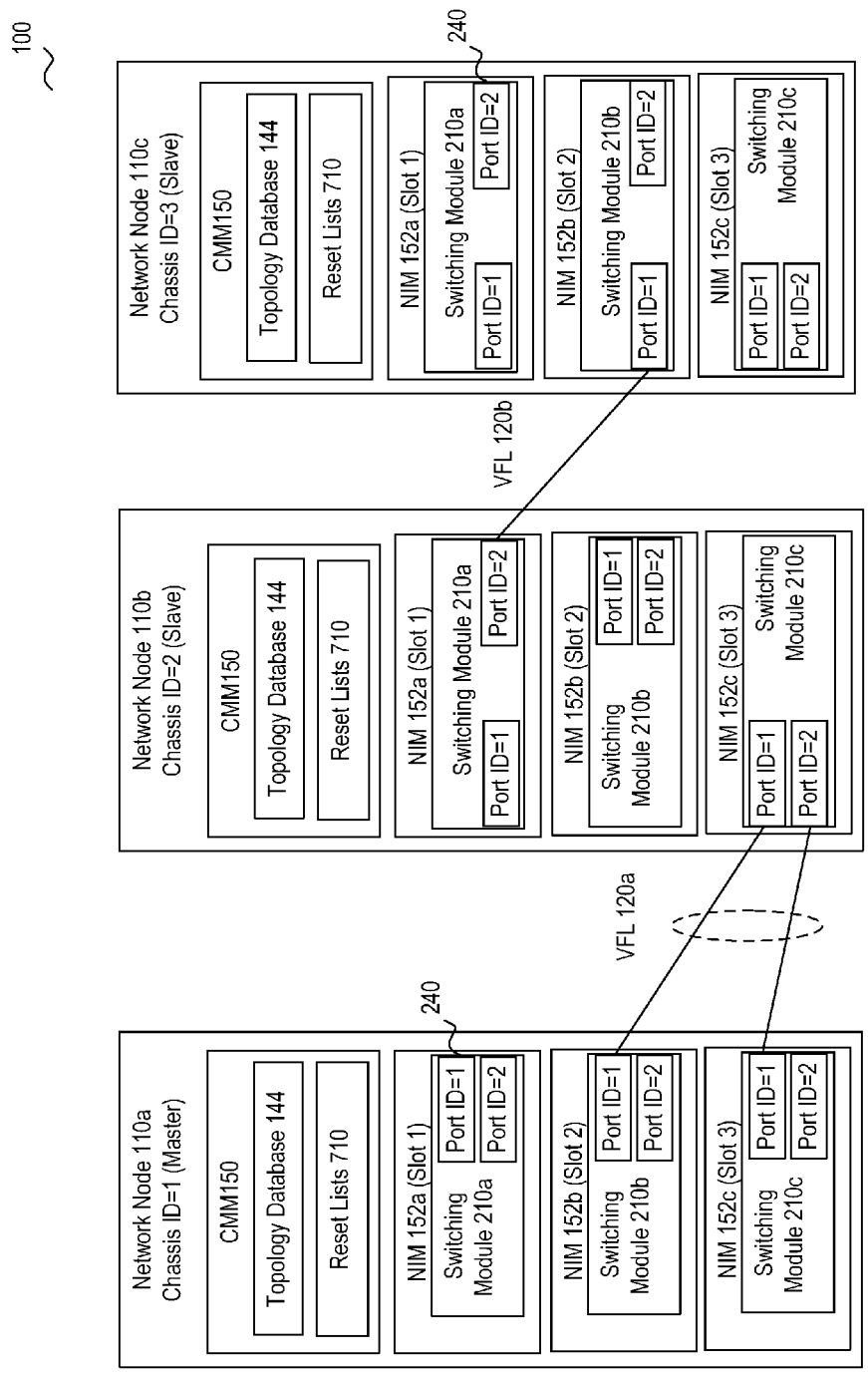
FIG. 17 illustrates a schematic block diagram of another embodiment of generation of a reset list in a virtual chassis system in accordance with the present invention.

FIG. 17 illustrates a schematic block diagram of another embodiment of generation of a reset list in a virtual chassis system 100. A virtual chassis split may be caused when one or more NIMs 152 that host a VFL 120 are reset. A reset of the NIM 152 includes a shutdown, reboot, reset, power-off, out-of-service state, or otherwise made inoperable in response to an administrative action. For example, in network node 110*b*, NIM 152*c* hosts VFL 120*a* that operably couples network node 110*a* and 110*b*. When NIM 152 is reset in response to an administrative action, VFL 120*a* will be inoperable causing a virtual chassis split in the system. A first subset of nodes (network node 110*a*) will be split, e.g. unable to communicate, with a second subset of nodes (network nodes 110*b* and 110*c*) in the system. In an embodiment, to prevent a virtual chassis split, a network interface module reset list is generated that includes a list of NIMs which should not be made inoperable in response to an administrative action to avoid a virtual chassis split. Table 8 below illustrates an exemplary network interface module reset list for an embodiment of the virtual chassis system 100 in FIG. 16. The network interface module is identified by the chassis ID of its network node 110 and slot number.

TABLE 8

| Reset NIM (Chassis ID, NIM ID) | Indicator of Virtual Chassis Split |
|---|---|
| Chassis ID = 1, NIM ID = Slot 1 | False |
| Chassis ID = 1, NIM ID = Slot 2 | False |
| Chassis ID = 1, NIM ID = Slot 3 | False |
| Chassis ID = 1, NIM ID = Slot 2, 3 | True |
| Chassis ID = 2, NIM ID = Slot 1 | True |
| Chassis ID = 2, NIM ID = Slot 2 | False |
| Chassis ID = 2, NIM ID = Slot 3 | True |
| Chassis ID = 3, NIM ID = Slot 1 | False |
| Chassis ID = 3, NIM ID = Slot 2 | True |
| Chassis ID = 3, NIM ID = Slot 3 | False |

In an embodiment, a warning may include a suggestion to reconfigure the VFL 120 to another NIM 152 prior to resetting a NIM 152 that will cause a virtual chassis split.

In another embodiment, resetting a port interface 240 which is an active member port of a VFL 120 may cause a virtual chassis split. For example, a reset of a VFL member port includes a shutdown, reboot, reset, power-off, out-of-service state, blocking mode or otherwise making the port interface inoperable in response to an administrative action. For example, a virtual chassis split may result in response to an administrative action that places a port interface into a blocking mode, resets the port interface, reboots the port interface or puts the port interface into a shutdown or out of service state or otherwise makes the port inoperable. In an embodiment, to prevent a virtual chassis split, a VFL member port reset list is generated that includes a list of port interfaces 240 that host a VFL link and an indicator of whether a warning should be issued when reset the corresponding port interface 240 is reset to avoid a virtual chassis split. Table 9 below illustrates an exemplary VFL member port reset list for an embodiment of the virtual chassis system 100 in FIG. 16. A port interface is identified by the chassis ID of its network node 110, slot number of its NIM 152 and port ID.

TABLE 9

| Reset Port (Chassis ID, Slot, Port ID) | Indicator of Virtual Chassis Split |
|---|---|
| Chassis ID = 1, NIM ID = Slot 2, Port ID = 1 | False |
| Chassis ID = 1, NIM ID = Slot 3, Port ID = 1 | False |
| Chassis ID = 2, NIM ID = Slot 1, Port ID = 2 | True |
| Chassis ID = 2, NIM ID = Slot 3, Port ID = 1 | False |
| Chassis ID = 2, NIM ID = Slot 3, Port ID = 2 | False |
| Chassis ID = 2, NIM ID = Slot 3, Port ID = 1, 2 | True |
| Chassis ID = 3, NIM ID = Slot 2, Port ID = 1 | True |

In an embodiment, a warning may include a suggestion to reconfigure the member port interface of the VFL 120 to another port interface 240 prior to resetting a port interface that will cause a virtual chassis split.

Figure 18:
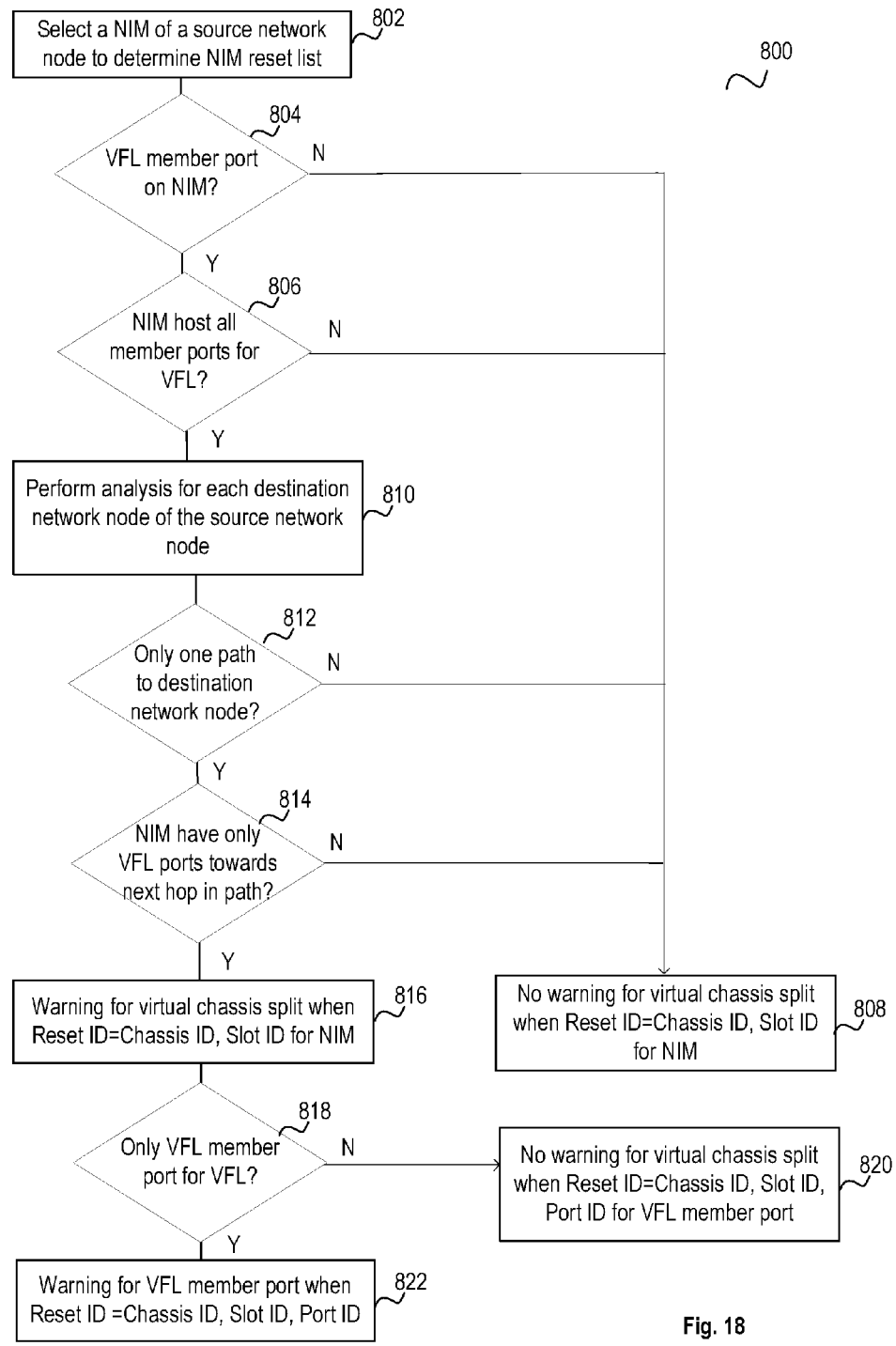
FIG. 18 illustrates a logic flow diagram of an embodiment of a method for generating the network interface module reset list and VFL member port reset list in the virtual chassis system in accordance with the present invention.

FIG. 18 illustrates a logic flow diagram of an embodiment of a method 800 for generating the network interface module reset list and/or VFL member port reset list in the virtual chassis system 100. The analysis is performed for a NIM 152 (identified by slot ID) for a network node 110 in the plurality of network nodes 110 in the virtual chassis system 100. In step 802, a first NIM 152 of one of the network nodes 110 of the plurality of network nodes 110 (e.g., the source network node) is selected for analysis. In step 804, the topology information in the topology database 144 is accessed to determine whether a VFL member port is included on the selected NIM. When there are no VFL member ports on the NIM in step 804, then the warning status for virtual chassis split is false for Reset ID=chassis ID, Slot ID for the NIM in step 808. When there are VFL member ports on the NIM in step 804, then the topology information in the topology database 144 is accessed to determine whether the NIM hosts all the VFL member ports for the VFL (e.g., does another NIM on the source network node also host VFL member ports for the VFL). If no, then the warning status for virtual chassis split is false for Reset ID=chassis ID, Slot ID for the NIM in step 808. If the NIM hosts all the member ports for the VFL in step 806, then topology information in the topology database 144 is accessed to determine a number of paths (e.g., VFLs) between the source network node and destination node in step 810. When other paths or VFLs connect the source and destination nodes in step 812, then the warning status for virtual chassis split is false for Reset ID=chassis ID, Slot ID for the NIM in step 808. When the NIM hosts the member ports of a VFL that is the only path or connection between the source network node and destination network node in step 812, the topology information in the topology database 144 is accessed to determine whether the VFL is the next hop in the path to the destination network node in step 814. If not, then the warning status for virtual chassis split is false for Reset ID=chassis ID, Slot ID for the NIM in step 808. If the NIM hosts the only member ports for the VFL that is the next hop in the path to the destination network node in step 814, then the warning status for virtual chassis split is true for Reset ID=chassis ID, Slot ID for the NIM in step 816.

The analysis continues in step 818 to generate a VFL member port reset list. For each VFL member port of the NIM, the analysis is performed in step 818. In step 818, the topology information in the topology database 144 is accessed to determine whether a member port of the VFL on the NIM is the only member port for the VFL. If not, then the warning indicator for virtual chassis split is false for Reset ID=chassis ID, Slot ID, Port ID for the VFL member port in step 820. When the member port of the VFL on the NIM is the only member port for the VFL in step 818, then the warning indicator for a virtual chassis split is true for Reset ID=chassis ID, Slot ID, Port ID for the VFL member port in step 822. This analysis in FIG. 18 is performed to generate the network interface module reset list and/or VFL member port reset list in the virtual chassis system 100.

FIGS. 16 and 18 illustrate exemplary processes to generate the reset lists for the example topologies described herein. Similar, additional or alternative processes or analysis may be performed to determine the reset lists for these topologies or for other topologies.

Figure 19:
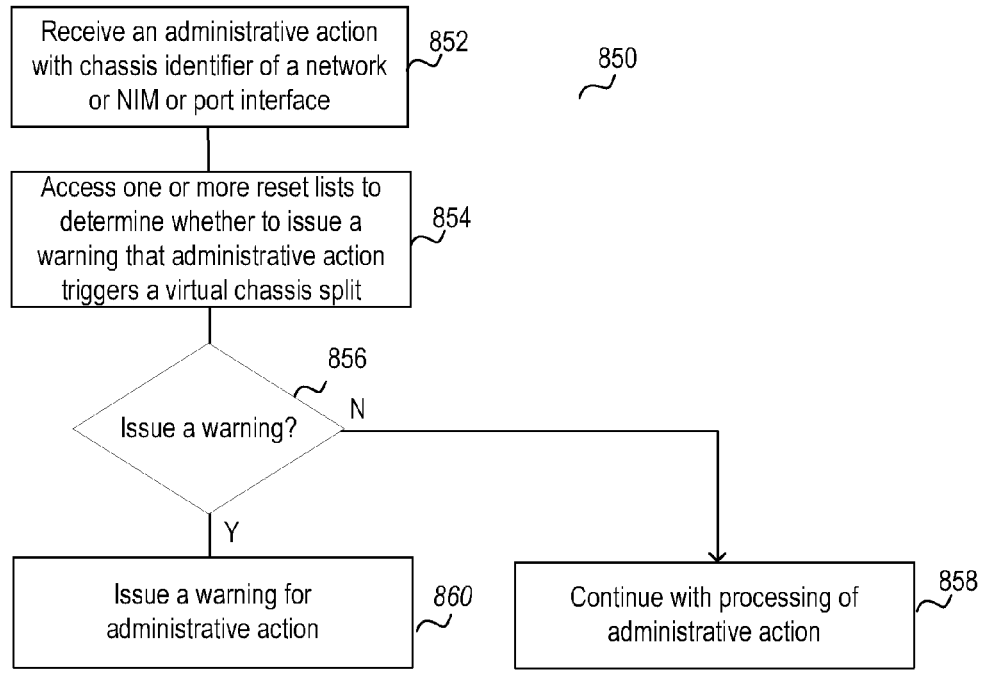
FIG. 19 illustrates a logic flow diagram of an embodiment of a method for processing an administrative action to help prevent a virtual chassis split in a virtual chassis system in accordance with the present invention.

FIG. 19 illustrates a logic flow diagram of an embodiment of a method 850 for processing an administrative action to help prevent a virtual chassis split in a virtual chassis system 100. In an embodiment, an administrative action is received in step 852. The administrative action includes a management command and an identifier of a network node 110, a NIM 152 or port interface 240. In response to the administrative action, one or more of the reset lists are accessed in step 854. For example, during the processing of an administrative action, such as a management command to reload or reset a network node 110, reload or reset a NIM 152, disable a NIM 152, shutdown a network node 110, perform an ISSU, disable a port interface 240, disable a VFL 120, etc., one or more of the reset lists are accessed for the identified devices (network node, NIM or port interface) affected by the administrative action. For example, the network node reset list, NIM reset list and/or the VFL member port interface reset list is accessed. Other or additional lists may also be accessed to help determine whether to issue a warning about a virtual chassis split. In step 856, it is determined whether to issue a warning of a virtual chassis split in response to the administrative action.

When it is determined not to issue a warning, e.g. one or more of the reset lists indicate that the administrative action will not cause a virtual chassis split, then the processing of the administrative action proceeds in step 858. However, when it is determined to issue a warning, e.g. the reset lists indicate that the administrative action may cause a virtual chassis split, then a warning is issued and transmitted to a user device for display. The warning includes for example, an indication that a virtual chassis split may occur in response to the administrative action. The warning may also include one or more suggestions to avoid a virtual chassis split, such as resetting the intended device with one or more other devices (such as resetting one or more other network nodes) specified in a reset list. The warning may also include a suggestion to reconfigure a VFL member port interface 240 to one or more other NIMs 152 prior to performing the administrative action.

In an embodiment, the warning is displayed by an element manager module in a graphical user interface, such as command line interface (CLI), Webview or alternative management application. In an embodiment, one or more options are provided, such as abort the administrative action, proceed with the administrative action despite the warning, and proceed with the administrative action with the warning suggestions, such as rebooting the intended device(s) plus other devices in the suggested reset list. In another embodiment, the administrative action is blocked from being processed. The warning or another notice is issued that includes a notice of nonperformance of the administrative action.

The reset lists helps to warn against a virtual chassis split in response to an administrative action in a virtual chassis system. This prevention delivers a more stable and robust system that reduces harmful events that occur due to a virtual chassis split, such as duplicate MAC addresses, duplicate configurable resources (e.g. IP interfaces), connectivity loss, loss of management access, instabilities due to multiple switch reset events, etc.

Figure 20:
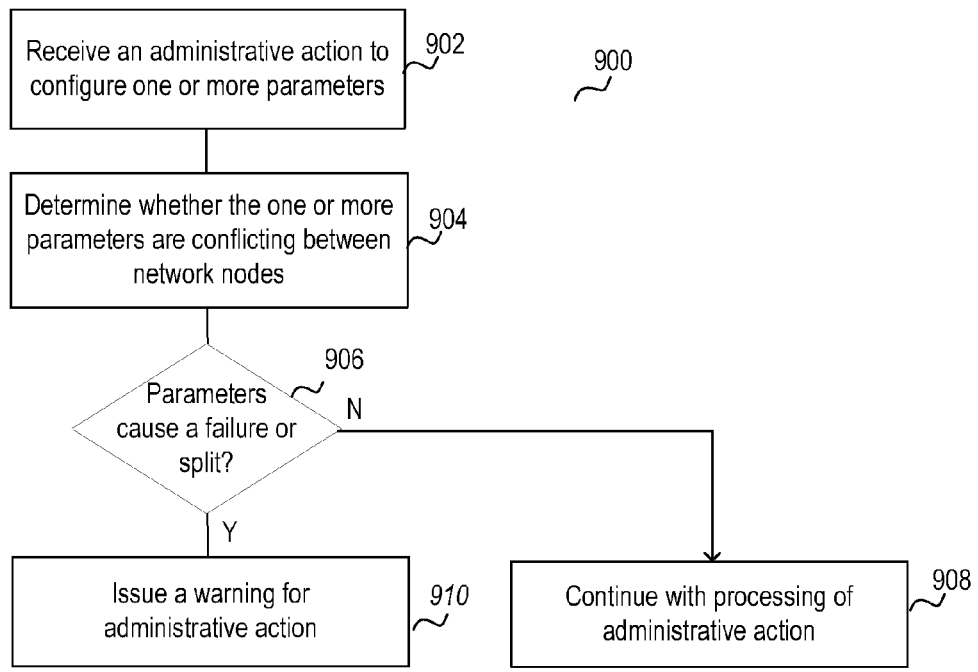
FIG. 20 illustrates a logic flow diagram of an embodiment of a method for processing an administrative action for configuration of one or more parameters to help prevent a virtual chassis split in a virtual chassis system in accordance with the present invention.

FIG. 20 illustrates a logic flow diagram of an embodiment of a method 900 for processing an administrative action for configuration of one or more parameters to help prevent a virtual chassis split in a virtual chassis system 100. For example, administrative actions that may trigger a virtual chassis split include inconsistent configuration of parameters on network nodes 110, such as, e.g. a) Configuring different control VLANs on distinct network nodes 110 within the virtual chassis topology; b) Configuring different intervals for health monitoring messages (such as hello or keep alive messages) on distinct network nodes 110 within the virtual chassis topology; c) Configuring different chassis groups (virtual chassis system identifiers) on distinct network nodes 110 within the virtual chassis topology. For example, when network nodes 110 in a virtual chassis system are configured with different virtual chassis system identifiers, then the network nodes 110 may initiate a virtual chassis split into different virtual chassis systems. In addition, configuring different control VLANs for control packets may cause control packets to be dropped and unprocessed and lead to a virtual chassis split. Also, configuring different hello intervals for health monitoring may cause incorrect conclusions of a failure of a node or module of a node. Other misconfigurations of parameters not disclosed herein may also cause failures or module malfunctions that can lead to a virtual chassis split.

In step 902, an administrative action is received to configure one or more parameters on one or more network nodes 110. In step 904, the configurations are analyzed to determine whether the one or more parameters are conflicting between network nodes 110 in the virtual chassis system or will otherwise cause a failure or lead to a virtual chassis split. If the configuration may lead to failures in step 906, then a warning is issued for the administrative action in step 910. The warning includes for example, an indication of the conflicting parameters between network nodes and/or that the configuration may lead to a failure or virtual chassis split. The warning may also include one or more suggestions to avoid a failure or virtual chassis split, such as different configuration parameters. In another embodiment, the administrative action is blocked from being processed. The warning or another notice is issued that includes a notice of nonperformance of the administrative action.

When it is determined in step 906 that the configuration of parameters do not lead to a failure or virtual chassis split, then the processing of the administrative action proceeds in step 908.

As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item, or one item configured for use with or by another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, microcontroller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional schematic blocks, and other illustrative blocks, modules and components herein, can be implemented as illustrated or combined or separated into discrete components, application specific integrated circuits, processors executing appropriate software and the like or any combination thereof.

The present invention is described herein, at least in part, in terms of one or more embodiments. An embodiment is described herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements.

The term "module" is used in the description of the various embodiments of the present invention. A module includes a processing module (as described above), a functional block, hardware, and/or software stored on memory operable to perform one or more functions as described herein. Note that, if the module is implemented via hardware, the hardware may operate independently and/or in conjunction with software and/or firmware. When a module is implemented as software stored in memory, the module is operable to use a processing module or other hardware to execute the software stored in memory in the module to perform the functions as described herein. A module described herein may include one or more sub-modules, each of which may be one or more modules, be incorporated into one or more other modules or include one or more other modules.

While particular combinations of various functions and features of the present invention are expressly described herein, other combinations of these features and functions are likewise possible. The embodiment described herein are not limited by the particular examples described and may include other combinations and embodiments.

What is claimed is:

1. A network node operable in a virtual chassis system, comprising:
    one or more network interface modules operable for coupling to a plurality of virtual fabric links (VFLs), wherein the VFLs are operably coupled to a plurality of network nodes in the virtual chassis system;
    at least one management module operable to:
        access a topology database of topology information that includes chassis identifiers of the plurality of network nodes and identification of the network interface modules and VFL member port interfaces coupled to the plurality of virtual fabric links (VFLs) in the network nodes; and
        generate the one or more reset lists based on the topology database, wherein the one or more reset lists includes one or more of the following:
            the chassis identifiers of the one or more of the plurality of network nodes in the virtual chassis system and the corresponding indicator of whether a reset of the chassis identifier triggers a virtual chassis split;
            network interface module (NIM) identifiers for one or more NIMs in one or more of the plurality of network nodes in the virtual chassis system and corresponding indicators of whether a reset of the one or more NIM identifiers triggers a virtual chassis split; and
            VFL member port identifiers for one or more of the plurality of network nodes in the virtual chassis system and corresponding indicators of whether a reset of the VFL member ports triggers a virtual chassis split; and
        receive a first administrative action that includes a chassis identifier of at least one of the plurality of network nodes in the virtual chassis system;
        access one or more reset lists, wherein the one or more reset lists includes chassis identifiers of one or more of the plurality of network nodes in the virtual chassis system and a corresponding indicator of whether a reset triggers a virtual chassis split; and
        determine from the one or more reset lists and the first administrative action whether to issue a warning that the first administrative action triggers a virtual chassis split; and
        when the first administrative action triggers a virtual chassis split, issue the warning for the first administrative action, wherein the warning blocks the first administrative action and includes a notice of nonperformance of the first administrative action.

2. The network node of claim 1, wherein the at least one management module is further operable to:

when the one or more reset lists indicates to issue the warning that the first administrative action triggers the virtual chassis split, determine from the one or more reset lists whether chassis identifiers of one or more other network nodes are listed that may be reset to avoid a virtual chassis split.

3. The network node of claim 2, wherein the first administrative action includes at least one of:
   a management command for resetting the at least one of the plurality of network nodes identified by the chassis identifier;
   a management command for rebooting the at least one of the plurality of network nodes identified by the chassis identifier;
   a management command for powering off the at least one of the plurality of network nodes identified by the chassis identifier;
   a management command for setting a shutdown state of the at least one of the plurality of network nodes identified by the chassis identifier; and
   a management command for setting an out-of-service state of the at least one of the plurality of network nodes identified by the chassis identifier.

4. The network node of claim 1, wherein the at least one management module is further operable to:
   receive a second administrative action, wherein the second administrative action includes a first network interface module (NIM) identifiers for one of the NIMs in one of the plurality of network nodes; and
   access one or more reset lists to determine whether to issue the warning that the second administrative action triggers a virtual chassis split.

5. The network node of claim 4, wherein the at least one management module is further operable to:
   receive a third administrative action, wherein the third administrative action includes a first VFL member port interface identifier; and
   access one or more reset lists to determine whether to issue the warning that the third administrative action triggers a virtual chassis split.

6. The network node of claim 1, wherein the at least one management module is further operable to:
   prior to performing the first administrative action, determine whether to issue the warning that the first administrative action triggers a virtual chassis split from the one or more reset lists; and
   when the first administrative action triggers a virtual chassis split, transmit the warning that the first administrative action triggers a virtual chassis split to a user display.

7. A method in a network node operable in a virtual chassis system that includes a plurality of virtual fabric links (VFLs) that are operably coupled to a plurality of network nodes, the method comprising:
   accessing a topology database of topology information for the virtual chassis system, wherein the topology information includes chassis identifiers of the plurality of network nodes and identification of network interface modules and VFL member port interfaces coupled to the plurality of virtual fabric links (VFLs) in the network nodes;
   generating the one or more reset lists based on the topology database, wherein the one or more reset lists includes one or more of the following:
      the chassis identifiers of the one or more of the plurality of network nodes in the virtual chassis system and the corresponding indicator of whether a reset of the chassis identifier triggers a virtual chassis split;
      network interface module (NIM) identifiers for one or more NIMs in one or more of the plurality of network nodes in the virtual chassis system and corresponding indicators of whether a reset of the one or more NIM identifiers triggers a virtual chassis split; and
      VFL member port identifiers for one or more of the plurality of network nodes in the virtual chassis system and corresponding indicators of whether a reset of the VFL member ports triggers a virtual chassis split; and
   receiving a first administrative action, wherein the first administrative action includes a chassis identifier of at least one of the plurality of network nodes in the virtual chassis system;
   accessing one or more reset lists, wherein the one or more reset lists includes chassis identifiers of one or more of the plurality of network nodes in the virtual chassis system and a corresponding indicator of whether a reset of the one or more of the plurality of network nodes triggers a virtual chassis split;
   determining from the one or more reset lists and the first administrative action whether to issue a warning that the first administrative action triggers a virtual chassis split; and
   when the first administrative action triggers a virtual chassis split, issue the warning for the first administrative action, wherein the warning facilitates blocking the first administrative action and includes a notice of nonperformance of the first administrative action.

8. The method of claim 7, further comprising:
   when the one or more reset lists indicates to issue the warning that the first administrative action triggers the virtual chassis split, determining from the one or more reset lists whether chassis identifiers of one or more other network nodes are listed that may be reset to avoid a virtual chassis split.

9. The method of claim 8, wherein the first administrative action includes at least one of:
   a management command for resetting the at least one of the plurality of network nodes identified by the chassis identifier;
   a management command for rebooting the at least one of the plurality of network nodes identified by the chassis identifier;
   a management command for powering off the at least one of the plurality of network nodes identified by the chassis identifier;
   a management command for setting a shutdown state of the at least one of the plurality of network nodes identified by the chassis identifier; and
   a management command for setting an out-of-service state of the at least one of the plurality of network nodes identified by the chassis identifier.

10. The method of claim 7, further comprising:
   receiving a second administrative action, wherein the second administrative action includes a first network interface module (NIM) identifiers for one of the NIMs in one of the plurality of network nodes; and
   accessing one or more reset lists to determine whether to issue the warning that the second administrative action triggers a virtual chassis split, wherein the warning blocks the second administrative action and includes a notice of nonperformance of the second administrative action.

11. The method of claim 10, further comprising:
receiving a third administrative action, wherein the third administrative action includes a first VFL member port interface identifier; and
accessing one or more reset lists to determine whether to issue the warning that the third administrative action triggers a virtual chassis split, wherein the warning blocks the third administrative action and includes a notice of nonperformance of the third administrative action.

12. The method of claim 7, further comprising
prior to performing the first administrative action, determining whether to issue the warning that the first administrative action triggers a virtual chassis split from the one or more reset lists; and
when the first administrative action triggers a virtual chassis split, transmitting to a user display the warning that the first administrative action triggers a virtual chassis split.

13. A network node operable in a virtual chassis system, comprising:
at least one management module operable to:
receive a first administrative action, wherein the first administrative action includes a request to configure one or more parameters of at least one of a plurality of network nodes in the virtual chassis system;
determine whether the one or more parameters conflict with configured parameters of another one of the plurality of network nodes in the virtual chassis system;
when the one or more parameters conflict, determine whether configuring the one or more parameters leads to a virtual chassis split;
when configuring the one or more parameters leads to a virtual chassis split, issue a warning for the first administrative action, wherein the warning blocks the first administrative action and includes a notice of nonperformance of the first administrative action;
receive a second administrative action, wherein the second administrative action includes a reset command associated with at least one of the plurality of network nodes in the virtual chassis system;
access one or more reset lists, wherein the one or more reset lists includes chassis identifiers of the plurality of network nodes in the virtual chassis system and a corresponding indicator of whether a reset triggers a virtual chassis split; and
when the one or more reset lists indicates that the reset command associated with at least one of the plurality of network nodes triggers a virtual chassis split, issue the warning for the second administrative action, wherein the warning blocks the second administrative action and includes a notice of nonperformance of the second administrative action.

14. The network node of claim 13, wherein the second administrative action includes at least one of:
a management command for resetting the at least one of the plurality of network nodes identified by the chassis identifier;
a management command for rebooting the at least one of the plurality of network nodes identified by the chassis identifier;
a management command for powering off the at least one of the plurality of network nodes identified by the chassis identifier;
a management command for setting a shutdown state of the at least one of the plurality of network nodes identified by the chassis identifier; and
a management command for setting an out-of-service state of the at least one of the plurality of network nodes identified by the chassis identifier.

15. The network node of claim 13, wherein the one or more reset lists includes one or more of the following:
the chassis identifiers of the one or more of the plurality of network nodes in the virtual chassis system and the corresponding indicator of whether a reset of the chassis identifier triggers a virtual chassis split;
network interface module (NIM) identifiers for one or more NIMs in one or more of the plurality of network nodes in the virtual chassis system and corresponding indicators of whether a reset of the one or more NIM identifiers triggers a virtual chassis split; and
VFL member port identifiers for one or more of the plurality of network nodes in the virtual chassis system and corresponding indicators of whether a reset of the VFL member ports triggers a virtual chassis split.

16. The network node of claim 15, wherein the at least one management module is further operable to:
receive a third administrative action, wherein the third administrative action includes a first network interface module (NIM) identifiers for one of the NIMs in one of the plurality of network nodes; and
access one or more reset lists to determine whether to issue the warning that the third administrative action triggers a virtual chassis split, wherein the warning blocks the third administrative action and includes a notice of nonperformance of the third administrative action.

17. The network node of claim 16, wherein the at least one management module is further operable to:
receive a fourth administrative action, wherein the fourth administrative action includes a first VFL member port interface identifier; and
access one or more reset lists to determine whether to issue the warning that the fourth administrative action triggers a virtual chassis split, wherein the warning blocks the fourth administrative action and includes a notice of nonperformance of the fourth administrative action.

* * * * *